United States Patent
Ahn et al.

(10) Patent No.: US 12,063,545 B2
(45) Date of Patent: *Aug. 13, 2024

(54) WIRELESS COMMUNICATION METHOD USING FRAGMENTATION AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Jinsam Kwak, Gyeonggi-do (KR); Geonjung Ko, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,315

(22) Filed: May 4, 2023

(65) Prior Publication Data

US 2023/0276300 A1 Aug. 31, 2023

Related U.S. Application Data

(63) Continuation of application No. 17/549,874, filed on Dec. 14, 2021, now Pat. No. 11,683,719, which is a
(Continued)

(30) Foreign Application Priority Data

| Apr. 4, 2016 | (KR) | 10-2016-0041302 |
| May 14, 2016 | (KR) | 10-2016-0059181 |
| May 20, 2016 | (KR) | 10-2016-0062424 |

(51) Int. Cl.
*H04W 28/04* (2009.01)
*H04L 1/1607* (2023.01)
(Continued)

(52) U.S. Cl.
CPC .......... *H04W 28/04* (2013.01); *H04L 1/1614* (2013.01); *H04L 1/1635* (2013.01);
(Continued)

(58) Field of Classification Search
CPC . H04W 28/04; H04W 28/06; H04W 28/0205; H04W 80/02; H04W 28/065;
(Continued)

(56) References Cited

U.S. PATENT DOCUMENTS

| 10,128,925 B2 | 11/2018 | Chun et al. |
| 11,700,546 B2 | 7/2023 | Ahn et al. |

(Continued)

FOREIGN PATENT DOCUMENTS

| AU | 2013257451 | 12/2013 |
| CN | 1735089 | 2/2006 |

(Continued)

OTHER PUBLICATIONS

Notice of Allowance dated Aug. 28, 2023 for Japanese Patent Application No. 2021-198490 and its English machine translation provided by the Applicant's foreign counsel.
(Continued)

*Primary Examiner* — Jackie Zuniga Abad
(74) *Attorney, Agent, or Firm* — WOMBLE BOND DICKINSON (US) LLP

(57) ABSTRACT

Provided is a wireless communication terminal that communicates wirelessly. The terminal includes: a transceiver; and a processor. The processor is configured to transmit first information on a fragmentation level to be used for data to
(Continued)

be transmitted to a recipient by using the transceiver in an add Block ACK (ADDBA) setup procedure.

2 Claims, 20 Drawing Sheets

Related U.S. Application Data continuation of application No. 16/151,304, filed on Oct. 3, 2018, now Pat. No. 11,240,705, which is a continuation of application No. PCT/KR2017/003698, filed on Apr. 4, 2017.

(51) Int. Cl.
| | |
|---|---|
| H04L 1/1829 | (2023.01) |
| H04L 1/1867 | (2023.01) |
| H04W 28/02 | (2009.01) |
| H04W 28/06 | (2009.01) |
| H04W 80/02 | (2009.01) |
| H04L 47/24 | (2022.01) |

(52) U.S. Cl.
CPC .......... *H04L 1/1864* (2013.01); *H04L 1/1896* (2013.01); *H04W 28/0205* (2013.01); *H04W 28/06* (2013.01); *H04W 28/065* (2013.01); *H04W 80/02* (2013.01); *H04L 47/24* (2013.01)

(58) Field of Classification Search
CPC ... H04W 84/12; H04W 74/085; H04W 28/14; H04L 47/24
See application file for complete search history.

(56) References Cited

U.S. PATENT DOCUMENTS

| | | |
|---|---|---|
| 2005/0089002 A1 | 4/2005 | Shin et al. |
| 2006/0048034 A1 | 3/2006 | Cho |
| 2006/0259598 A1 | 11/2006 | Kim et al. |
| 2008/0212612 A1 | 9/2008 | Singh et al. |
| 2010/0315999 A1 | 12/2010 | Kakani et al. |
| 2012/0327915 A1 | 12/2012 | Kang et al. |
| 2013/0176939 A1 | 7/2013 | Trainin et al. |
| 2013/0223345 A1 | 8/2013 | Asterjadhi et al. |
| 2013/0301553 A1 | 11/2013 | Klein |
| 2013/0343275 A1 | 12/2013 | Merlin et al. |
| 2014/0112322 A1 | 4/2014 | Ram et al. |
| 2014/0241270 A1 | 8/2014 | Tohzaka et al. |
| 2015/0092697 A1 | 4/2015 | Yeow et al. |
| 2015/0358067 A1 | 12/2015 | Zhang et al. |
| 2016/0174240 A1 | 6/2016 | Li |
| 2016/0182205 A1 | 6/2016 | Asterjadhi et al. |
| 2016/0227533 A1 | 8/2016 | Josiam et al. |
| 2016/0315675 A1 | 10/2016 | Seok |
| 2016/0345362 A1 | 11/2016 | Lee et al. |
| 2017/0127446 A1 | 5/2017 | Huang et al. |
| 2017/0171723 A1 | 6/2017 | Adachi |
| 2017/0171878 A1 | 6/2017 | Chun et al. |
| 2017/0279864 A1 | 9/2017 | Chun et al. |
| 2018/0139699 A1 | 5/2018 | Choi et al. |
| 2018/0213516 A1 | 7/2018 | Kim et al. |
| 2018/0219661 A1 | 8/2018 | Liu et al. |
| 2018/0310338 A1 | 10/2018 | Li et al. |
| 2019/0045391 A1 | 2/2019 | Ahn et al. |
| 2019/0289495 A1 | 9/2019 | Chu et al. |
| 2022/0104068 A1 | 3/2022 | Ahn et al. |

FOREIGN PATENT DOCUMENTS

| | | |
|---|---|---|
| CN | 1784668 | 6/2006 |
| CN | 101129024 | 2/2008 |
| CN | 101594366 | 12/2009 |
| CN | 102752797 | 10/2012 |
| CN | 102771059 | 11/2012 |
| CN | 102771060 | 11/2012 |
| CN | 103873190 | 6/2014 |
| CN | 104115542 | 10/2014 |
| CN | 104350799 | 2/2015 |
| CN | 104471891 | 3/2015 |
| CN | 104704868 | 6/2015 |
| CN | 106922034 | 7/2017 |
| EP | 2755343 | 7/2014 |
| EP | 3 393 145 | 10/2018 |
| JP | 2008-509622 | 3/2008 |
| JP | 2015-529047 | 10/2015 |
| JP | 2017/523647 | 8/2017 |
| JP | 2019-513308 | 5/2019 |
| KR | 10-2006-0053671 | 5/2006 |
| KR | 10-2011-0024542 | 3/2011 |
| KR | 10-2016-0031442 | 3/2016 |
| WO | 2006/016745 | 2/2006 |
| WO | 2010/140748 | 12/2010 |
| WO | 2011/108832 | 9/2011 |
| WO | 2012/064502 | 5/2012 |
| WO | 2013/070175 | 5/2013 |
| WO | 2013/129861 | 9/2013 |
| WO | 2013/169212 | 11/2013 |
| WO | 2013/170136 | 11/2013 |
| WO | 2015/199518 | 12/2015 |
| WO | 2016/003037 | 1/2016 |
| WO | 2016/027937 | 2/2016 |
| WO | 2016/028131 | 2/2016 |
| WO | 2016/032007 | 3/2016 |
| WO | 2016/032258 | 3/2016 |
| WO | 2016/105515 | 6/2016 |
| WO | 2017/150042 | 9/2017 |
| WO | 2017/176034 | 10/2017 |

OTHER PUBLICATIONS

Alfred Asterjadhi et al.: "Fragmentation for MU frames—Follow", doc.: IEEE 802.11-15/1318r0, Nov. 8, 2015, slides 1-15.
Abu-Surra, Shadi et al.: "PHY/MAC Complete Proposal Specification", doc.: IEEE 802.11-10/0433r2, May 18, 2010, pp. 1-335.
Notice of Allowance dated Aug. 31, 2023 for Vietnamese Patent Application No. 1-2018-04928 and its English machine translation provided by the Applicant's foreign counsel.
Office Action dated Sep. 27, 2023 for Korean Patent Application No. 10-2023-7026901 and its English translation provided by the Applicant's foreign counsel.
International Search Report for PCT/KR2017/003698 mailed on Jul. 7, 2017 and its English translation from WIPO (now published as WO 2017/176034).
Written Opinion of the International Searching Authority for PCT/KR2017/003698 mailed on Jul. 7, 2017 and its English translation by Google Translate (now published as WO 2017/176034).
Extended European Search Report dated Sep. 27, 2019 for EP Patent Application No. 17779334.6.
Office Action dated Sep. 30, 2019 for Japanese Application No. 2018-552725 and its English translation provided by Applicant's foreign counsel.
Alfred Asterjadhi (Qualcomm INC): "Fragmentation for MU frames-Follow up on acks; Internet URL: https://mentor.ieee.org/802.11/dcn/16/11-16-0050-01-00axfragmentation-for-mu-frames-follow-up-on-acks.pptx", IEEE-SA Mentor, Piscataway, NJ USA, doc. IEEE 802.11-16/0050rl, No. 1, Jan. 19, 2016 XP068104806, pp. 1-20.
Laurent Cariou (Intel): "Proposed Spec Text for fragmentation operation; 11-16-1381-00-00ax-proposed-text-changes-for-fragmentation-operation", IEEE-SA Mentor, Psicataway, NJ USA, doc. IEEE 802.11-16/1381r0, Nov. 7, 2016, XP068110761, pp. 1-9; URL:https://mentor.ieee.org/802.11/den/16/11-16-1381-00-00ax-proposed-text-changes-for-fragmentation.docx.
Woojin Ahn (Wilus): "Regarding HE fragmentation", IEEE Draft; 11-16-0641-00-00AX-Regarding-HE-Fragmentation, IEEE-SA Mentor, Piscataway, NJ USA, doc. IEEE 802.11-16/0641r0, May 16, 2016, XP068119496, pp. 1-12, Retrieved from the internet: URL:https://mentor.ieee.org/802.11/dcn/16/11-16-0641-00-00ax-regarding-he-fragmentation.pptx.

(56) References Cited

OTHER PUBLICATIONS

Ming Gan et al. (Qualcomm INC): Fragmentation-25.3.3-Part 2, IEEE 802.11-16/0941r0, Apr. 17, 2016, XP055478430, pp. 1-8. URL: https://mentor.ieee.org/11-16-0941-00-00ax-er-he-fragmentation-part2.
Office Action dated Dec. 27, 2019 for U.S. Appl. No. 16/125,530.
International Search Report mailed on Dec. 10, 2015 for PCT/KR2015/008845 and its English translation from WIPO.
Office Action dated Jan. 27, 2020 for Japanese Patent Application No. 2018-552725 and its English translation provided by Applicant's foreign counsel.
Office Action dated Nov. 29, 2020 for Indian Patent Application No. 201827037360.
Office Action dated Mar. 17, 2021 for Korean Patent Application No. 10-2018-7025838 and its English translation provided by the applicant's foreign counsel.
Office Action dated Mar. 22, 2021 for Chinese Patent Application No. 201780022278.0 and its English translation provided by the applicant's foreign counsel.
Office Action dated Jul. 22, 2021 for Korean Patent Application No. 10-2018-7025838 and its English translation provided by Applicant's foreign counsel.
Office Action dated Sep. 3, 2021 for U.S. Appl. No. 16/928,754.
Office Action dated Aug. 17, 2021 for U.S. Appl. No. 16/928,838.
Notice of Allowance dated Oct. 13, 2021 for Korean Patent Application No. 10-2018-7025838 and its English translation provided by Applicant's foreign counsel.
Notice of Allowance dated Nov. 8, 2021 for Japanese Patent Application No. 2020-147466 and its English translation provided by Applicant's foreign counsel.
Notice of Allowance dated Nov. 8, 2021 for Japanese Patent Application No. 2020-147465 and its English translation provided by Applicant's foreign counsel.
Notice of Allowance dated Sep. 30, 2021 for European Patent Application No. 17 779 334.6.
Notice of Allowance dated Sep. 17, 2021 for U.S. Appl. No. 16/151,304 (now published as U.S. 2019/0045391).
Supplemental Notice of Allowance dated Oct. 12, 2021 for U.S. Appl. No. 16/151,304 (now published as U.S. 2019/0045391).
Final Office Action dated May 3, 2021 for U.S. Appl. No. 16/151,304 (now published as U.S. 2019/0045391).
Non-Final Office Action dated Nov. 3, 2020 for U.S. Appl. No. 16/151,304 (now published as U.S. 2019/0045391).
Advisory Action dated Aug. 3, 2020 for U.S. Appl. No. 16/151,304 (now published as U.S. 2019/0045391).
Final Office Action dated Apr. 10, 2020 for U.S. Appl. No. 16/151,304 (now published as U.S. 2019/0045391).
Non-Final Office Action dated Oct. 2, 2019 for U.S. Appl. No. 16/151,304 (now published as U.S. 2019/0045391).
Notice of Allowance dated Mar. 1, 2023 for U.S. Appl. No. 16/928,754.
Corrected Notice of Allowance dated Mar. 16, 2023 for U.S. Appl. No. 16/928,754.
Hearing Notice dated Nov. 29, 2022 for Indian Patent Application No. 201827037360.
Office Action dated Jan. 23, 2023 for Japanese Patent Application No. 2021-198490 and its English translation provided by Applicant's foreign counsel.
Notice of Allowance dated Feb. 16, 2023 for U.S. Appl. No. 17/549,869.
Office Action dated Sep. 1, 2022 for Korean Patent Application No. 10-2022-7025345 and its English translation provided by Applicant's foreign counsel.
Office Action dated Sep. 12, 2022 for Korean Patent Application No. 10-2022-7025799 and its English translation provided by Applicant's foreign counsel.
Office Action dated Sep. 23, 2022 for U.S. Appl. No. 17/549,869.
Office Action dated Oct. 20, 2022 for U.S. Appl. No. 16/928,754.
Notice of Allowance dated Apr. 18, 2022 for Korean Patent Application No. 10-2022-7000424 and its English translation provided by Applicant's foreign counsel.
Notice of Allowance dated Apr. 21, 2022 for Korean Patent Application No. 10-2022-7000425 and its English translation provided by Applicant's foreign counsel.
Notice of Allowance dated Apr. 25, 2022 for Korean Patent Application No. 10-2022-7000098 and its English translation provided by Applicant's foreign counsel.
Notice of Allowance dated May 7, 2022 for Chinese Patent Application No. 201780022278.0 and its English translation provided by Applicant's foreign counsel.
Advisory Action dated May 31, 2022 for U.S. Appl. No. 16/928,754.
Office Action dated Apr. 29, 2022 for Vietnamese Patent Application No. 1-2018-04928 and its English translation provided by Applicant's foreign counsel.
Notice of Allowance dated Feb. 16, 2023 for U.S. Appl. No. 17/549,874 (now published as U.S. 2022/0104068).
Office Action dated Sep. 23, 2022 for U.S. Appl. No. 17/549,874 (now published as U.S. 2022/0104068).
Office Action dated Dec. 19, 2023 for Korean Patent Application No. 10-2023-7037286 and its English translation provided by the Applicant's foreign counsel.
Office Action dated Feb. 2, 2024 for Chinese Patent Application No. 202210810030.3 and its English translation provided by the Applicant's foreign counsel.
Office Action dated Feb. 3, 2024 for Chinese Patent Application No. 202210808610.9 and its English translation provided by the Applicant's foreign counsel.
Notice of Allowance dated Feb. 8, 2024 for Chinese Patent Application No. 202210808967.7 and its English translation provided by the Applicant's foreign counsel.
Texas Instruments: "Embedding ACK/NAK in CQI Reference Signals and Receiver Structures", 3GPP TSG RAN WG1 #51bis, R1-080190, Sevilla, Spain, Jan. 9, 2008, pp. 1-7.
Padma Sudarsan, Alcatel-Lucent: "UID_480046 Minutes Study on Alignment of 3GPP PM IRP and TMF Interface Program (TIP) PM", 3GPP TSG-SA5 (Telecom Management), S5-101658, Meeting SA5#72, Bratislava, Slovakia, Jul. 16, 2010, pp. 1-1.
Office Action dated May 30, 2024 for U.S. Appl. No. 18/204,944.

WIRELESS COMMUNICATION METHOD USING FRAGMENTATION AND WIRELESS COMMUNICATION TERMINAL USING SAME

CROSS-REFERENCE TO RELATED APPLICATIONS

This application is a continuation of U.S. patent application Ser. No. 17/549,874 filed on Dec. 14, 2021, which is a continuation of U.S. patent application Ser. No. 16/151,304 filed on Oct. 3, 2018, now issued as U.S. Pat. No. 11,240,705 dated Feb. 1, 2022, which is a continuation of International Patent Application No. PCT/KR2017/003698 filed on Apr. 4, 2017, which claims the priority to Korean Patent Application No. 10-2016-0041302 filed in the Korean Intellectual Property Office on Apr. 4, 2016, Korean Patent Application No. 10-2016-0059181 filed in the Korean Intellectual Property Office on May 14, 2016, and Korean Patent Application No. 10-2016-0062424 filed in the Korean Intellectual Property Office on May 20, 2016, the entire contents of which are incorporated herein by reference.

TECHNICAL FIELD

The present invention relates to a wireless communication method and a wireless communication terminal using fragmentation.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel. Therefore, required is a technology capable of efficiently using bandwidths by simultaneously transmitting data between a plurality of terminals and base terminals.

DISCLOSURE

Technical Problem

An object of an embodiment of the present invention is to provide a wireless communication terminal using fragmentation.

Technical Solution

According to an embodiment of the present invention, provided is a wireless communication terminal that is an originator for transmitting data, the wireless communication terminal including: a transceiver; and a processor, wherein the processor is configured to transmit first information on a fragmentation level to be used for data to be transmitted to a recipient by using the transceiver in an add Block ACK (ADDBA) setup procedure.

The first information may relate to a fragmentation level to be used when transmitting data corresponding to a specific TID to the recipient.

The processor may be configured to receive second information from the recipient by using the transceiver, and determine a fragmentation level of data corresponding to the specific TID based on the second information, wherein the second information may be information on a fragmentation level of a fragment that the recipient is capable of receiving when the recipient receives data corresponding to the specific TID.

The processor may fragment data corresponding to the specific TID at a fragmentation level equal to or lower than the fragmentation level indicated by the second information.

The processor may be configured to insert the first information into the ADDBA request frame and transmit the ADDBA request frame to the recipient.

According to an embodiment of the present invention, provided is a wireless communication terminal that is a recipient for receiving data, the wireless communication terminal including: a transceiver; and a processor, wherein the processor is configured to receive first information from an originator that is to transmit data by using the transceiver, wherein the first information is information on a fragmentation level to be used by the originator for data to be transmitted to the wireless communication terminal.

The first information may be information on a fragmentation level that the originator is to use when transmitting data corresponding to a specific TID to the wireless communication terminal.

The processor may be configured to transmit second information to the originator by using the transceiver, wherein the second information may be information on a fragmentation level of a fragment that the wireless communication terminal is capable of receiving when the wireless communication terminal receives data corresponding to the specific TID.

The processor may be configured to receive an Add Block ACK (ADDBA) request frame from the originator and obtain the first information from the ADDBA request frame.

The processor may be configured to insert second information into an ADDBA response frame, and transmit the ADDBA response frame to the originator, wherein the second information may be information on a fragmentation level of a fragment that the wireless communication terminal is capable of receiving.

The processor may be configured to receive data from the originator by using the transceiver, select a Block ACK frame format based on the first information, and transmit a Block ACK frame for data received from the originator according to the Block ACK frame format.

The processor may be configured to select a Block ACK frame format based on the first information.

The data may be transmitted through an A-MPDU, and the Aggregate-MAC Protocol Data Unit (MPDU) may include at least one fragment, wherein when the fragment number of the at least one fragment is all 0, the processor may be configured to transmit a Block ACK frame including a bit map of which each bit indicates whether each MAC Service Data Unit (MSDU) is received.

The data may be transmitted through the A-MPDU, wherein when all the MPDUs included in the A-MPDU are received, the processor may be configured to transmit a Block ACK frame including a bit map of which each bit indicates whether each MAC Service Data Unit (MSDU) is received.

According to an embodiment of the present invention, provided is an operation method of a wireless communication terminal that is an originator for transmitting data, the method including: inserting first information on a fragmentation level to be used for data to be transmitted to a recipient into an add block ACK (ADDBA) request frame; and transmitting the ADDBA request frame to the recipient.

The first information may relate to a fragmentation level to be used when transmitting data corresponding to a specific TID to the recipient.

The method may further include: receiving an ADDBA response frame from the recipient by using the transceiver, obtaining second information from the ADDBA response frame; and determining a fragmentation level of data corresponding to the specific TID based on the second information, wherein the second information may be information on a fragmentation level of a fragment that the recipient is capable of receiving when the recipient receives data corresponding to the specific TID.

The determining the fragmentation level of the data corresponding to the specific TID may include determining the fragmentation level of data corresponding to the specific TID as a fragmentation level equal to or lower than a fragmentation level indicated by the second information.

A size of a Buffer Size field value of the ADDBA request frame may implicitly represent the first information, wherein the Buffer Size field may indicate information on a buffer size required for the data transmission.

Advantageous Effects

An embodiment of the present invention provides a communication method using fragmentation and a wireless communication terminal using the same.

MODE FOR CARRYING OUT THE INVENTION

Figure 1:
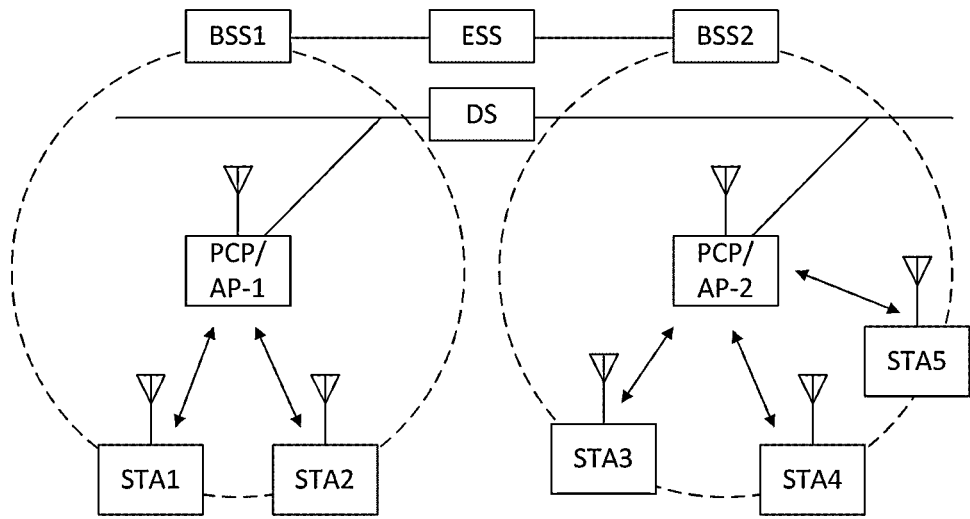
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0041302 (Apr. 4, 2016), Nos. 10-2016-0059181 (May 14, 2016), and Nos. 10-2016-0062424 (May 20, 2016) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
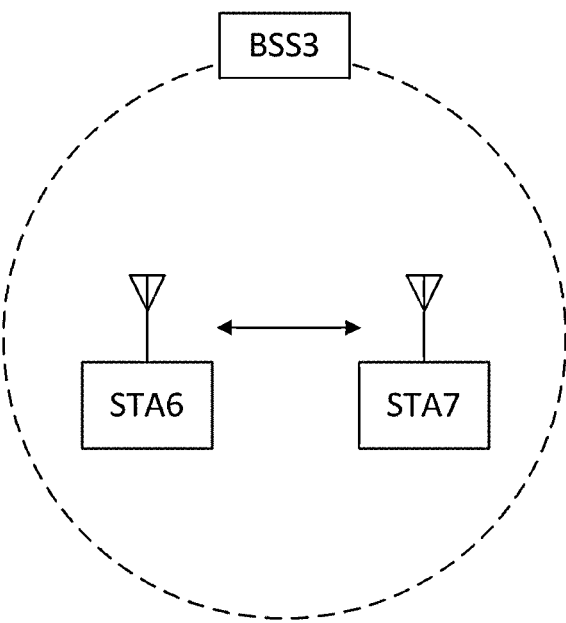
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
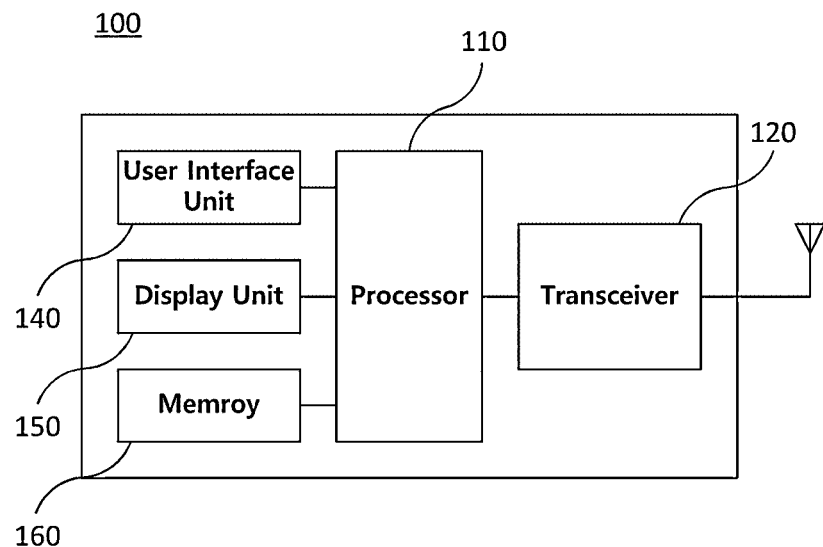
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
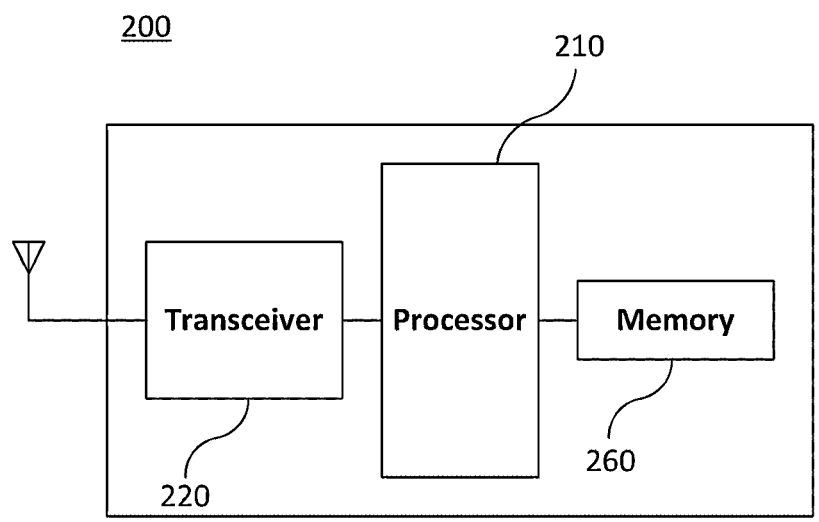
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
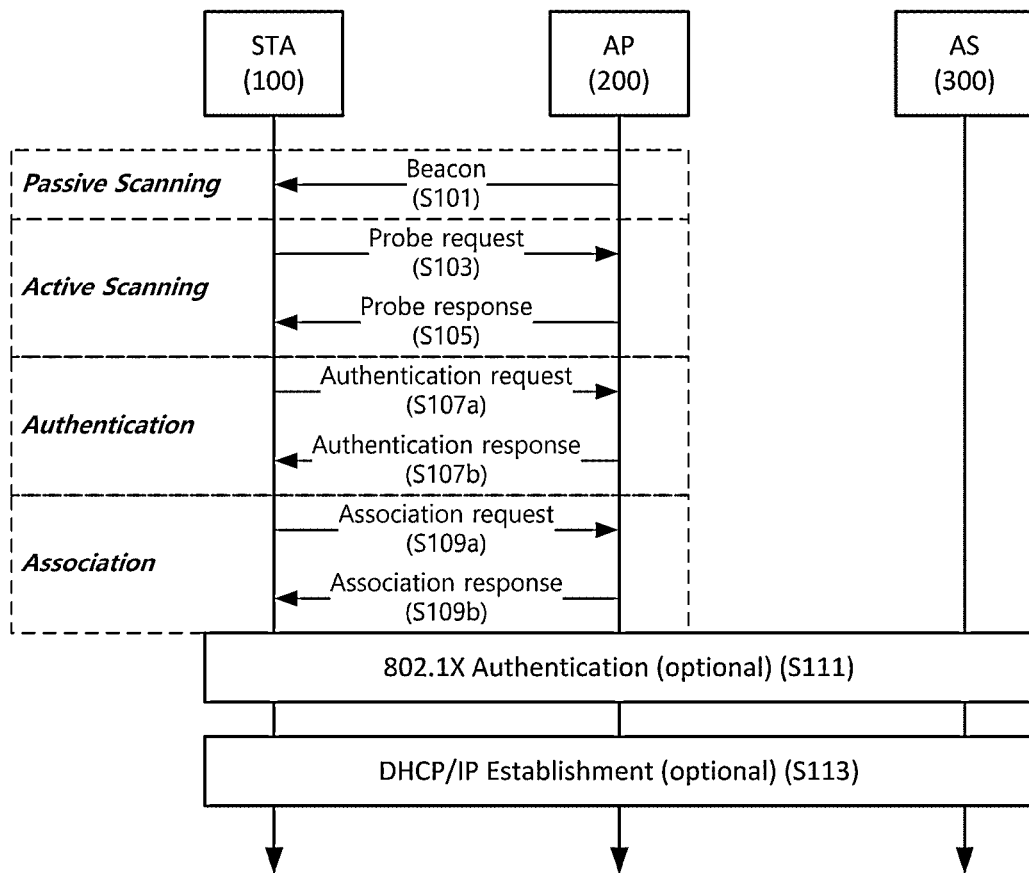
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP.

The wireless communication terminal may fragment and transmit at least one of a MAC service data unit (MSDU), an Aggregate (A)-MSDU, and a management protocol data unit (MMPDU). For convenience of explanation, a portion of an MSDU, a portion of an A-MSDU, or a portion of an MMPDU, which are generated through fragmentation, is referred to as a fragment. In addition, a wireless communication terminal that transmits data is referred to as an originator, and a wireless communication terminal that receives data is referred to as a recipient.

Specifically, the wireless communication terminal may generate a plurality of fragments by fragmenting at least one of an MSDU, an A-MSDU, and an MMPDU. In this case, the wireless communication terminal may transmit the generated plurality of fragments by using a plurality of MPDUs. In addition, the wireless communication terminal receiving a plurality of fragments may de-fragment a plurality of fragments to obtain at least one of one MSDU, one A-MSDU, and one MMPDU. In this case, the MPDU may be an S-MPDU or an A-MPDU.

Figure 6:
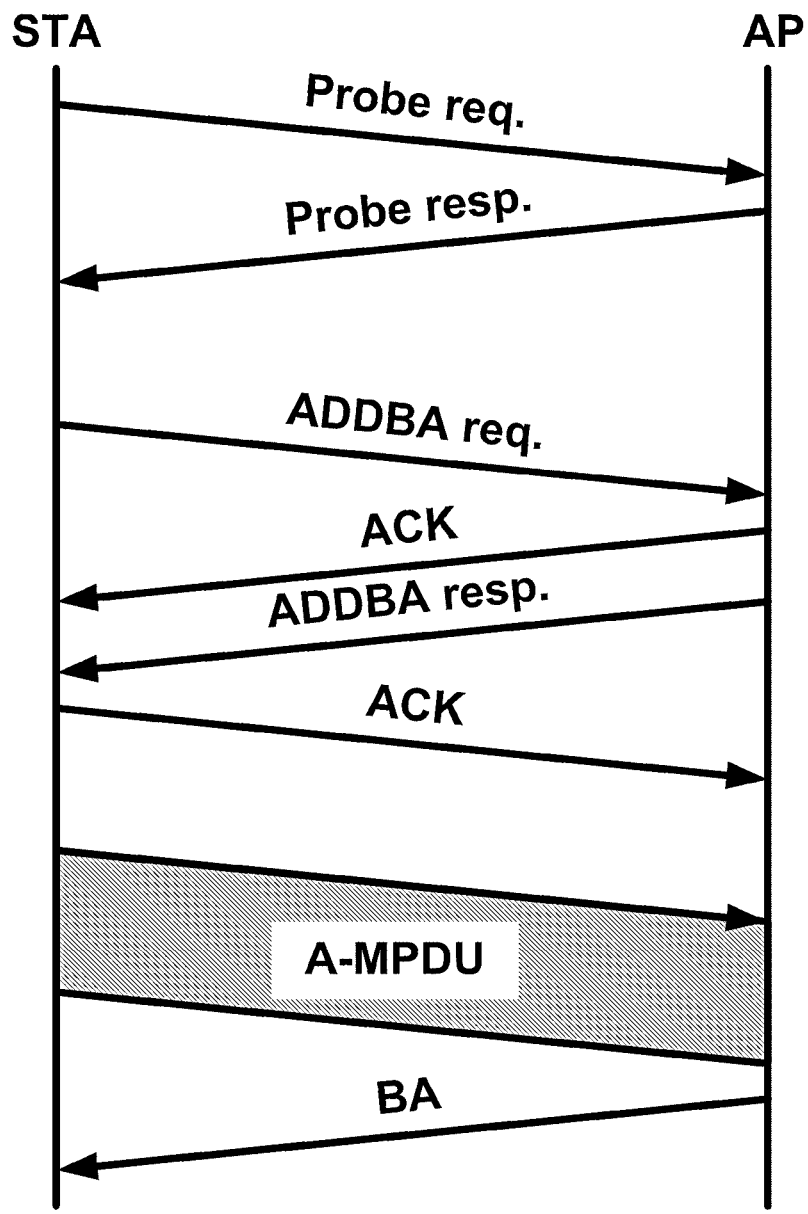
FIG. 6 shows a method of transmitting information on a fragmentation level using ADDBA according to an embodiment of the present invention.

FIG. 6 shows a method of transmitting information on a fragmentation level using ADDBA according to an embodiment of the present invention.

The recipient needs sufficient buffer capacity and processing capacity to de-fragment multiple fragments. For this, the originator needs to know the fragmentation level that the recipient may support. Therefore, the wireless communication terminal may signal about the fragmentation level indicating the degree of fragmentation that the wireless communication terminal is capable of receiving. Specifically, the wireless communication terminal transmits, during a link setup process with a wireless communication terminal that is an AP, information on a fragmentation level of a fragment that is receivable by the wireless communication terminal, and receive information on the fragmentation level of a fragment that is receivable by the wireless communication terminal that is an AR Specifically, the wireless communication terminal may transmit information on the fragmentation level through the Operation element. In a specific embodiment, the wireless communication terminal may transmit information on the fragmentation level via the Capabilities field of the Operation element. In this case, the Capabilities field may be a field indicating the capability of the wireless communication terminal. Further, the wireless communication terminal may transmit information on the fragmentation level through at least one of a probe request frame, a probe response frame, an authentication request frame, an authentication response frame, an association request frame, and an association response frame.

In addition, the fragmentation level may be divided into four levels. Level 0 may indicate that the wireless communication terminal does not support fragmentation for the MSDU the wireless communication terminal receives. Also, level 1 may indicate that the wireless communication terminal is capable of receiving an MPDU that includes one fragment. In this case, the MPDU may be a single MPDU that is not aggregated with another MPDU, or an MPDU that is not an A-MPDU. Also, level 2 may indicate that the wireless communication terminal is capable of receiving an A-MPDU that includes one fragment per MSDU. Specifically, level 2 may indicate that the wireless communication terminal is capable of receiving an A-MPDU that includes one or fewer fragments per MSDU. Level 3 may indicate that the wireless communication terminal is capable of receiving an A-MPDU including a plurality of fragments per MSDU. Specifically, level 3 may indicate that the wireless communication terminal is capable of receiving an A-MPDU that includes four or fewer fragments per MSDU.

In the embodiment of FIG. 6, a station STA transmits a probe request frame Probe req. to an access point AP. In this case, the station STA inserts information on the fragmentation level supported by the station in the probe request frame Probe req. In addition, the access point AP transmits a probe response frame Probe resp. to the station STA. In this case, the access point AP inserts information on the fragmentation level supported by the access point AP in the probe response frame Probe resp.

The STA and the AP negotiate the transmission of the Block ACK frame through the ADDBA request frame ADDBA req. and the ADDBA response frame ADDBA resp. The station STA transmits the A-MPDU based on the information on the fragmentation level transmitted by the access point AP. Specifically, the station STA transmits the A-MPDU including the fragmentation level fragment supported by the access point AP to the access point AP based on the information on the fragmentation level transmitted by the access point AR The access point AP transmits a Block Ack (BA) frame for the A-MPDU to the station STA.

If the recipient does not include a fragment or receives an A-MPDU including one fragment for each MSDU, the recipient may transmit a Block ACK frame including a bitmap indicating the receipt of each MSDU. In addition, when the recipient receives an A-MPDU including a plurality of fragments corresponding to one MSDU, the recipient may transmit a Block ACK frame including a bitmap indicating whether or not each fragment is received. A specific form of the Block ACK frame will be described with reference to FIG. 14 to FIG. 22.

If the recipient supports fragment level 3 and fails to receive one or more of the MPDUs included in the A-MPDU, the recipient may not know whether the originator has transmitted multiple fragments corresponding to one MSDU through the A-MPDU. Therefore, a recipient supporting level 3 always needs to transmit a Block ACK frame including a bitmap indicating whether or not each fragment is received.

In addition, the link setup is performed only when the wireless communication terminal accesses the new BSS. Therefore, when transmitting information on the fragmentation level through the link setup procedure, once the link setup is done, it is required to perform unnecessary link setup again to reset the fragmentation level. Therefore, it is difficult for the wireless communication terminal to reset the fragmentation level according to the network situation. Also, in the link setup process, it is difficult for the wireless communication terminal to specify the type of traffic to be received or transmitted by the wireless communication terminal. Therefore, when the wireless communication terminal transmits information on the fragmentation level through link setup, it may be difficult for the wireless communication terminal to specify a fragmentation level for each type of traffic.

When considering these points, there is a need for a method to efficiently transmit information on the fragmentation level and to negotiate the fragmentation level dynamically between the originator and the sender. Embodiments about the fragmentation level information transmission and the fragmentation level negotiation will be described with reference to FIG. 6 to FIG. 14.

Figure 7:
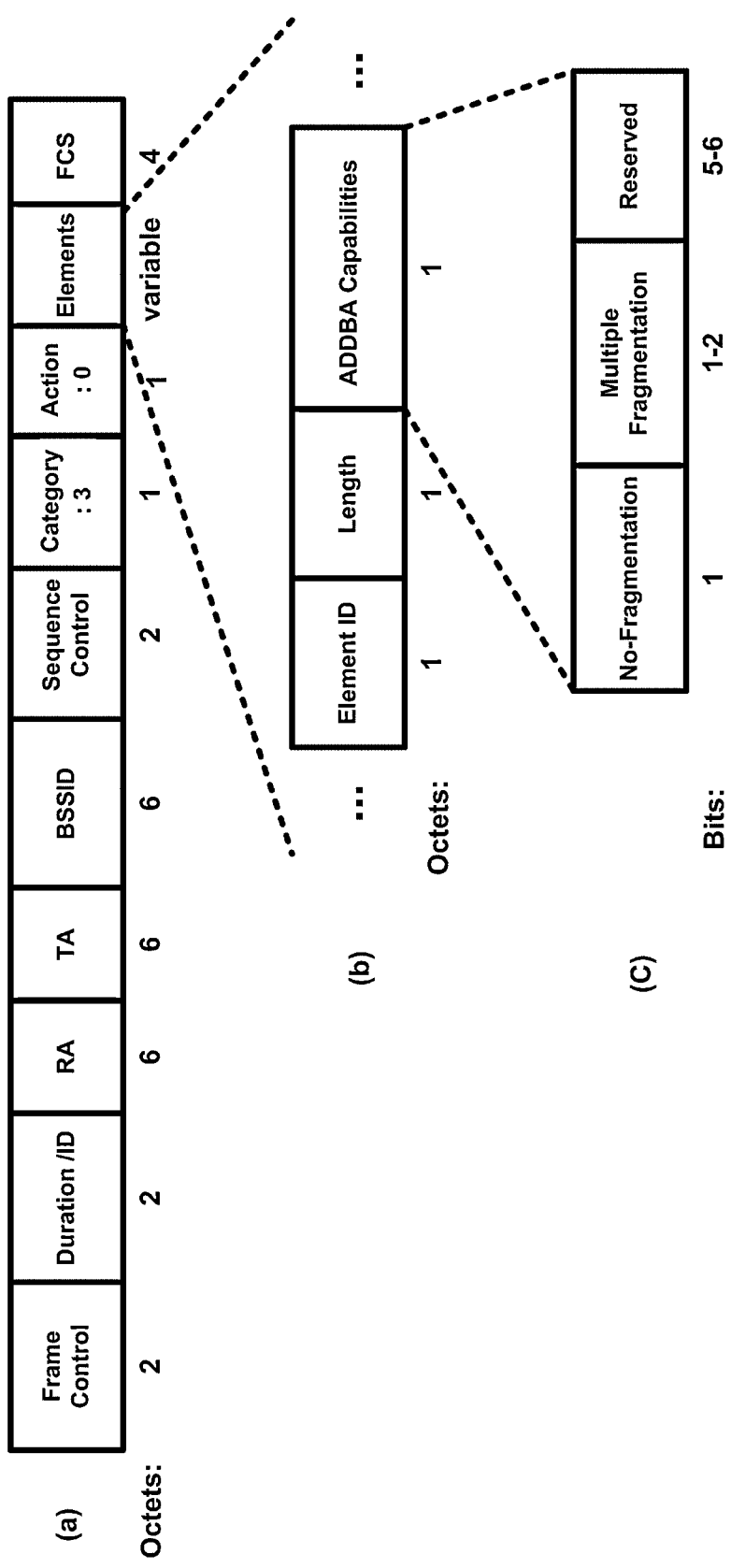
FIG. 7 shows the format of an ADDBA request frame and an ADDBA response frame signaling information on a fragmentation level according to another embodiment of the present invention.

FIG. 7 shows the format of an ADDBA request frame and an ADDBA response frame signaling information on a fragmentation level according to another embodiment of the present invention.

The originator may signal the level of fragmentation to use during data transmission through the Add Block Acknowledgment (ADDBA) setup procedure to set up Block ACK frame transmission. In addition, the originator may determine the fragmentation level to use during data transmission through the ADDBA procedure based on information on the fragmentation level signaled by the recipient. Specifically, the originator may transmit an ADDBA request frame including the Block ACK frame related parameters to the recipient. The recipient may transmit an ADDBA response frame to the originator to configure the Block ACK frame transmission. In this case, the ADDBA request frame and the ADDBA response frame are one kind of action frame. Accordingly, the wireless communication terminal may transmit the ADDBA request frame when the wireless communication terminal is required. If the fragmentation level to be used for data transmission is determined through an Add Block Acknowledgment (ADDBA) procedure to set up Block ACK frame transmission, the originator and the recipient may change the level of fragmentation used for data transmission more flexibly.

In the ADDBA setup procedure, the originator may transmit information on the fragmentation level that is intended to be used when transmitting data to the recipient. Specifically, the originator may transmit information on the fragmentation level to use when transmitting data through the ADDBA request frame. The information on the fragmentation level may indicate the maximum value of the fragment level that the originator intends to use when transmitting data. In addition, the information on the fragmentation level may be specified for each TID. Specifically, the originator may transmit information on the fragmentation level to use when transmitting data corresponding to a specific TID through the ADDBA request frame. The specific TID may be a TID specified in the Block ACK Parameter Set of the ADDBA request frame. For example, the originator may set the fragmentation level which is signaled by the ADDBA request frame to level 0, to signal that the originator does not intend to transmit the fragment when transmitting data for that TID. For example, the originator may set the fragmentation level which is signaled by the ADDBA request frame to level 1 to signal that the originator does not intend to fragment when transmitting data for the corresponding TID. Specifically, the originator may set the level of fragmentation which is signaled by the ADDBA request frame to level 1 to indicate that the originator will transmit one MPDU including one fragment when transmitting data for the corresponding TID. In this case, the MPDU may be a single MPDU that is not aggregated with another MPDU or an MPDU that is not an A-MPDU, as described above. For example, the originator may set the fragmentation level which is signaled by the ADDBA request frame to level 2 to signal that the originator intends to transmit the fragment corresponding to level 2 or lower when transmitting data for the corresponding TID. Specifically, the originator may set the fragmentation level which is signaled by the ADDBA request frame to level 2 to signal that the originator intends to transmit one or fewer fragments for each MSDU when transmitting data for the corresponding TID via the A-MPDU. For example, the originator may set the fragmentation level which is signaled by the ADDBA request frame to level 3 to signal that the originator intends to transmit the fragment corresponding to level 3 or lower when transmitting data for the corresponding TID. Specifically, the originator may set the fragmentation level which is signaled by the ADDBA request frame to level 3 to signal that the originator intends to transmit four or fewer fragments for each MSDU when the originator transmits data for the corresponding TID via the A-MPDU.

Also, in the ADDBA setup procedure, the recipient may transmit, to the originator, information on the fragmentation level that the recipient is capable of supporting when receiving the data. Specifically, the recipient may transmit information on the fragmentation level that the recipient supports when receiving the data through the ADDBA response frame. The information on the fragmentation level may be the maximum value of the fragment level of the fragment that the recipient is capable of receiving. In addition, the information on the fragmentation level may be specified for each TID. Specifically, the recipient may transmit information on the fragmentation level that the recipient supports when receiving data corresponding to a specific TID through an ADDBA response frame. The specific TID may be a TID specified in the Block ACK Parameter Set of the ADDBA response frame. For example, the recipient may set the fragmentation level which is signaled by the ADDBA response frame to level 0to signal that the recipient is not capable of receiving the fragment when receiving data for the corresponding TID. In addition, the recipient may set the level of fragmentation which is signaled by the ADDBA response frame to level 1 to signal that the recipient is only capable of receiving fragments corresponding to level 1 or lower when transmitting data for a corresponding TID. Specifically, the recipient may set the level of fragmentation which is signaled by the ADDBA response frame to level 1 to indicate that a recipient is capable of receiving one MPDU including one fragment when receiving data for the corresponding TID. In this case, the MPDU may be a single MPDU that is not aggregated with another MPDU or an MPDU that is not an A-MPDU, as described above. In addition, the recipient may set the level of fragmentation which is signaled by the ADDBA response frame to level 2 to signal that the recipient is capable of receiving fragments corresponding to level 1 or level 2 when receiving data for a corresponding TID. Specifically, the recipient may set the level of fragmentation which is signaled by the ADDBA response frame to level 2 to signal that the recipient is capable of receiving one MPDU including one fragment or an A-MPDU including one or fewer fragments per MSDU. In addition, the recipient may set the level of fragmentation which is signaled by the ADDBA response frame to level 3 to signal that the recipient is capable of receiving fragments corresponding to level 1, level 2, or level 3 when receiving data for a corresponding TID. Specifically, the recipient may set the level of fragmentation which is signaled by the ADDBA response frame to level 3 to signal that the recipient is capable of receiving one MPDU including one fragment or an A-MPDU including four or fewer fragments per MSDU.

The originator may receive information on the fragmentation level from the recipient. Specifically, the originator may receive the ADDBA response frame and obtain information on the fragmentation level which is signaled by the ADDBA response frame. The originator may determine the level of fragmentation to use when transmitting data based on information on the fragmentation level obtained. Specifically, the originator may transmit data by fragmenting the data to be below the fragmentation level indicated by the information on the obtained fragmentation level. In addition, the recipient may select the bitmap format of the Block ACK frame based on the determined fragmentation level. After the recipient receives the data, the recipient may transmit a Block ACK frame with the selected bitmap format to the originator. Also, until the fragmentation level is changed again through the ADDBA procedure, the originator may operate based on the determined fragmentation level. Specifically, until the originator receives information on the fragmentation level through the new ADDBA setup procedure, the originator may operate based on the previously determined fragmentation level. In a specific embodiment, the originator may transmit a new ADDBA request frame, and until a new ADDBA response frame is received, the originator may operate based on the determined fragmentation level. Until the fragmentation level is changed again through the ADDBA procedure, the recipient may also operate based on the determined fragmentation level. In addition, the originator may operate according to the fragmentation level determined through the ADDBA procedure, regardless of the fragmentation level information transmitted during link setup. The recipient may also operate according to the fragmentation level determined through the ADDBA procedure, regardless of the fragmentation level information transmitted during link setup.

In another specific embodiment, the originator may request, from the recipient, a fragmentation level that is less than or equal to the fragmentation level which is signaled by the recipient in the link setup process. Specifically, the originator may signal that the fragmentation level, which is less than or equal to the fragmentation level signaled by the recipient during link setup, will be used for data to be transmitted to the recipient. In addition, the recipient may signal that the recipient is capable of receiving a fragmentation level that is less than or equal to the fragmentation level which is requested by the originator.

In a specific embodiment, the originator and recipient may transmit information on the fragmentation level via the ADDBA Capabilities field, which is included in the ADDBA request frame and the ADDBA response frame. In this case, the ADDBA Capabilities field may include a Multiple Fragmentation field indicating the fragmentation level. The Multiple Fragmentation field may be a one-bit field indicating whether the fragmentation level is a level lower than level 2 or a level higher than level 2. In another specific embodiment, the Multiple Fragmentation field may be a 2-bit field indicating which level the fragmentation level is from level 0 to level 3. The format of the specific ADDBA request frame and the ADDBA response frame may be as shown in FIG. 7(a). In addition, the format of the ADDBA Capabilities field may be as shown in FIGS. 7(b) and 7(c).

Figure 8:
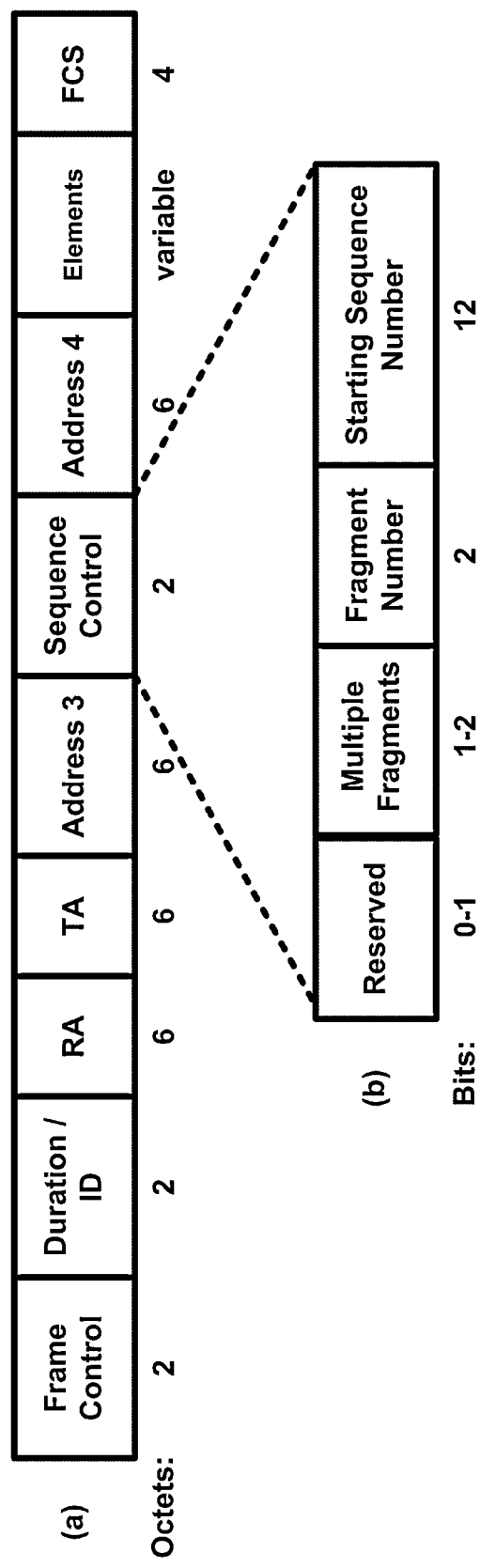
FIG. 8 shows a MAC frame format for signaling information on a fragmentation level according to another embodiment of the present invention.

FIG. 8 shows a MAC frame format for signaling information on a fragmentation level according to another embodiment of the present invention.

The originator may transmit information on the fragmentation level through the MPDU that includes the data. Specifically, the originator may transmit information on the fragmentation level through the Sequence Control field of the MPDU that includes the data. The legacy wireless communication terminal may fragment and transmit one MSDU to a maximum of 16 fragments. Therefore, in the sequence control field of the MPDU, the legacy wireless communication terminal sets the Fragment Number field indicating the fragment number as a 4-bit field. The wireless communication terminal according to the embodiment of the present invention may fragment and transmit one MSDU to a maximum of four fragments. Therefore, in the sequence control field of the MPDU, the wireless communication terminal according to the embodiment of the present invention may set the Fragment Number field indicating the fragment number as a 2-bit field. In this case, the wireless communication terminal may set the remaining 2 bits as the Multiple Fragmentation field indicating the fragmentation level or the reserved bit. Specifically, the Multiple Fragmentation field may be a one-bit field indicating whether the fragmentation level is a level lower than level 2 or a level higher than level 2. In another specific embodiment, the Multiple Fragmentation field may be a 2-bit field indicating which level the fragmentation level is from level 0 to level 3. The format of the specific MPDU may be the same as that shown in FIG. 8(a). In addition, the format of the Sequence Control field may be the same as that shown in FIG. 8(b). In another specific embodiment, the originator may transmit information on the fragmentation level through the header of the MPDU including the data. In this case, the originator may transmit information on the fragmentation level through the Frame Control element of the header of the MPDU including the data.

The recipient may select the Block ACK frame format based on the ADDBA response frame. In this case, the recipient may transmit the Block ACK frame for the data transmitted by the originator according to the selected Block ACK frame format. Specifically, if the originator indicates the fragmentation level for each MPDU including the data, the recipient may clearly recognize the fragmentation level used for the data transmission received by the recipient. Therefore, the recipient may select the Block ACK frame format according to the fragmentation level. In this case, the recipient may transmit the Block ACK frame for the data transmitted by the originator according to the selected Block ACK frame format.

Figure 9:
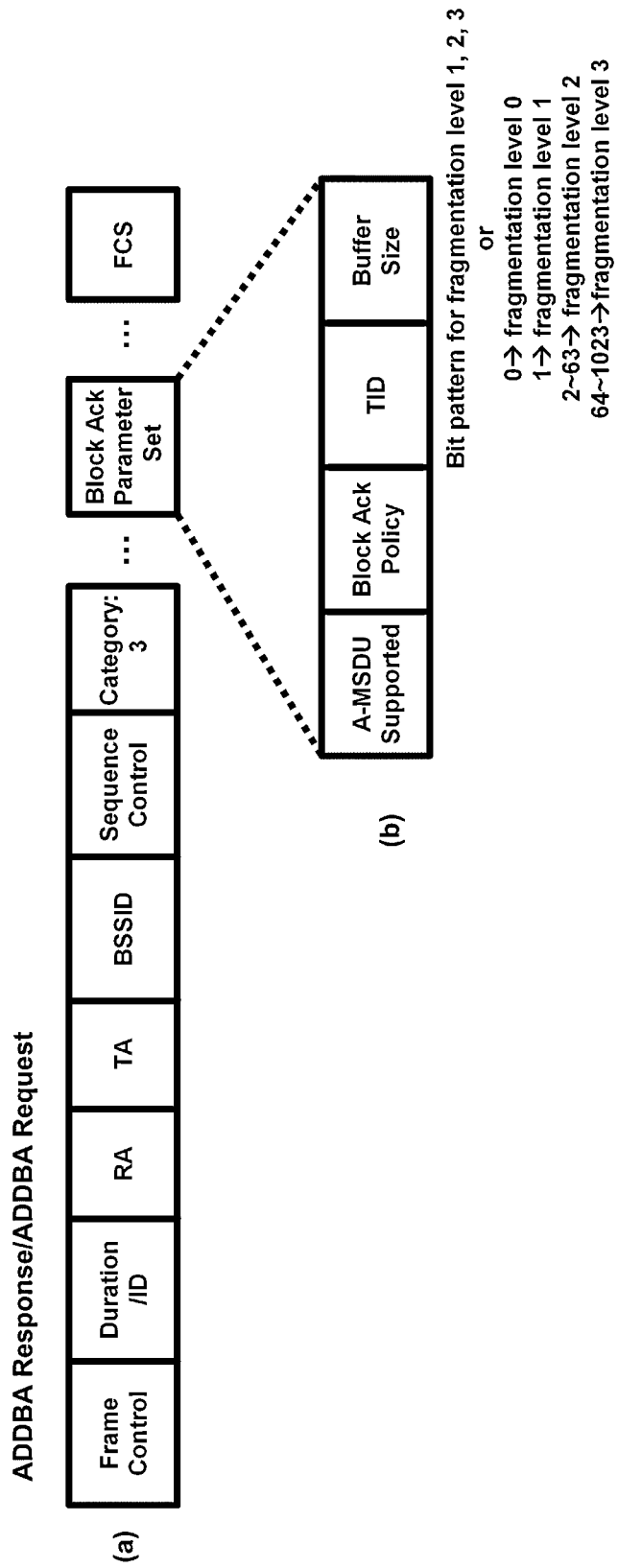
FIG. 9 shows the format of an ADDBA response frame and an ADDBA request frame signaling information on a fragmentation level according to another embodiment of the present invention.

FIG. 9 shows the format of an ADDBA response frame and an ADDBA request frame signaling information on a fragmentation level according to another embodiment of the present invention.

In the embodiment illustrated in FIG. 7, the recipient may signal information on the fragmentation level through the Buffer Size field, rather than the ADDBA Capabilities field of the ADDBA response frame. Specifically, the recipient may set some bits in the Buffer Size field of the ADDBA response frame to signal information on the fragmentation level. In a specific embodiment, the LSB 1 bit or the MSB 1 bit of the Buffer Size field of the ADDBA response frame may be set to signal the information on the fragmentation level. In this case, the information on the fragmentation level may indicate whether the fragmentation level is lower than level 2 or higher than level 2. In another specific embodiment, the recipient may set the LSB 2 bits or the MSB 2 bits of the Buffer Size field of the ADDBA response frame to signal information on the fragmentation level. In this case, the information on the fragmentation level may indicate the level from the level 0 to the level 3 of the fragmentation level.

Specifically, the recipient may implicitly signal information on the fragmentation level through the size of the value represented by the Buffer Size field of the ADDBA response frame. For example, when the value of the Buffer Size field is 0, the Buffer Size field may indicate that the fragmentation level is level 0. Additionally, when the value of the Buffer Size field is 1, the Buffer Size field may indicate that the fragmentation level is level 1. Also, when the value of the Buffer Size field is greater than or equal to 2 and less than or equal to 63, the Buffer Size field may indicate that the fragmentation level is level 2. Also, when the value of the Buffer Size field is greater than or equal to 64 and less than or equal to 1023, the Buffer Size field may indicate that the fragmentation level is level 3.

In addition, the originator may also signal information on the fragmentation level through the Buffer Size field of the ADDBA request frame. In this case, the format of the Buffer Size field and the signaling method may be the same as those of the above-describe embodiments in which the recipient signals information on the fragmentation level through the ADDBA response frame.

Also, the originator and the recipient may signal information on the fragmentation level for each TID as described in FIG. 7. In this case, the TID may be specified by the Block ACK Parameter Set field.

The format of the specific ADDBA response frame and ADDBA request frame may be the same as that in the embodiment of FIG. 9(a). In addition, the format of the Block ACK Parameter Set field may be the same as that in the embodiment of FIG. 9(b).

Figure 10:
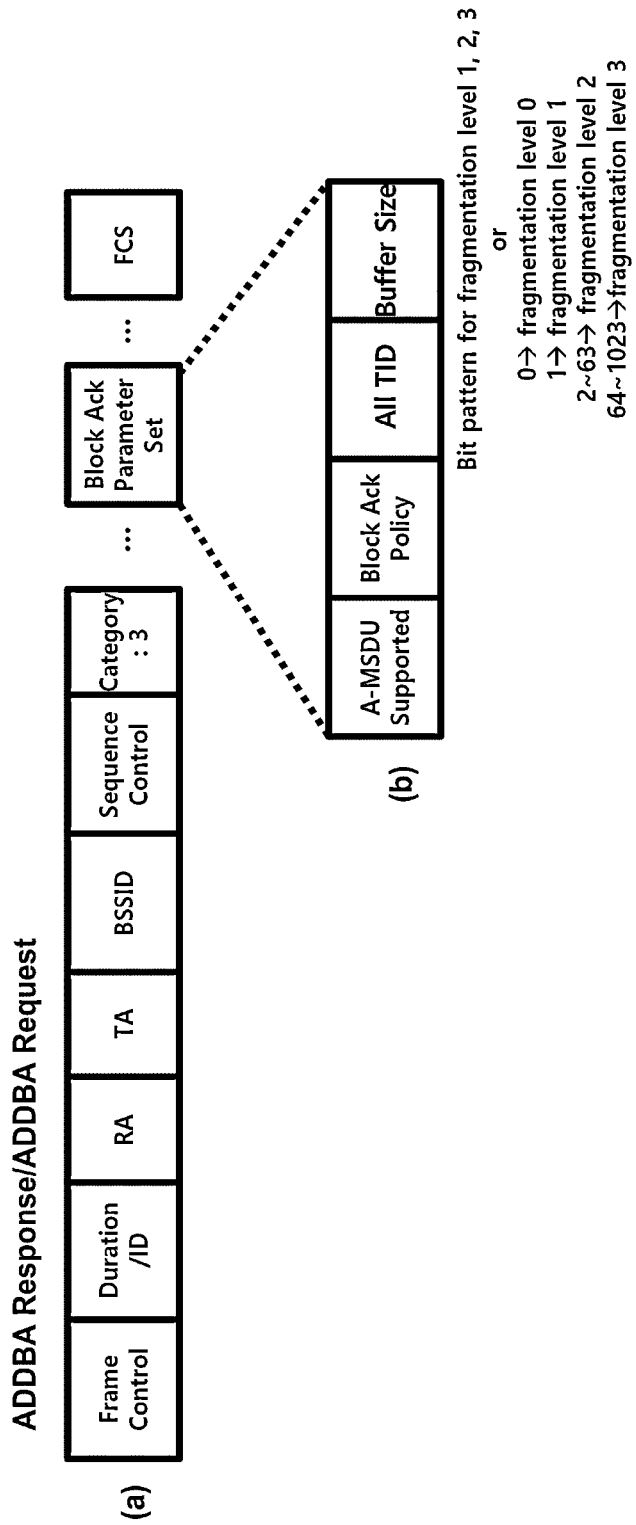
FIG. 10 shows the format of an ADDBA response frame and an ADDBA request frame signaling information on a fragmentation level according to another embodiment of the present invention.

FIG. 10 shows the format of an ADDBA response frame and an ADDBA request frame signaling information on a fragmentation level according to another embodiment of the present invention.

When the ADDBA response frame sets Block ACK frame transmission for a plurality of TIDs, the recipient may set the sub-field of the Block ACK Parameter Set field to indicate that information on the corresponding fragmentation level is applied to all TIDs for which Block ACK frame transmission is set by the ADDBA response frame. In this case, a sub-field of the Block ACK Parameter Set field may be referred to as an All TID field. The All TID field may be a 1-bit field.

Also, when the ADDBA request frame sets Block ACK frame transmission for a plurality of TIDs, the originator may set the sub-field of the Block ACK Parameter Set field to indicate that information on the corresponding fragmentation level is applied to all TIDs indicated by the ADDBA response frame. In this case, a sub-field of the Block ACK Parameter Set field set by the originator may be referred to as an All TID field. The All TID field may be a 1-bit field.

The format of the specific ADDBA response frame and the ADDBA request frame is the same as that in the embodiment of FIG. 10(a), and the format of the Block ACK Parameter Set field may be the same as that in the embodiment of FIG. 10(b). The operation of the originator and recipient except for the setting of the All TID field may be the same as the operation of originator and recipient in the embodiment of FIG. 9. In addition, the format of the ADDBA request frame and the format of the ADDBA response frame, which exclude the All TID field, may be the same as the format of the ADDBA request frame and the format of the ADDBA response frame described in the embodiment of FIG. 9.

In the embodiments described with reference to FIGS. 7 to 10, the originator and the recipient exchange information on the fragmentation level based on a one-to-one. Also, when transmitting information on the fragmentation level by using the ADDBA procedure, the fragmentation level to be used for data transmission is determined through the 4-way handshake. Therefore, it may take a relatively long time to determine the fragmentation level to be used for data transmission. When the wireless communication terminal transmits information on the fragmentation level through the trigger frame, one wireless communication terminal may transmit information on the fragmentation level to a plurality of wireless communication terminals. Also, within a relatively short period of time, the fragmentation level to be used for data transmission may be determined. This will be described with reference to FIGS. 11 to 12.

Figure 11:
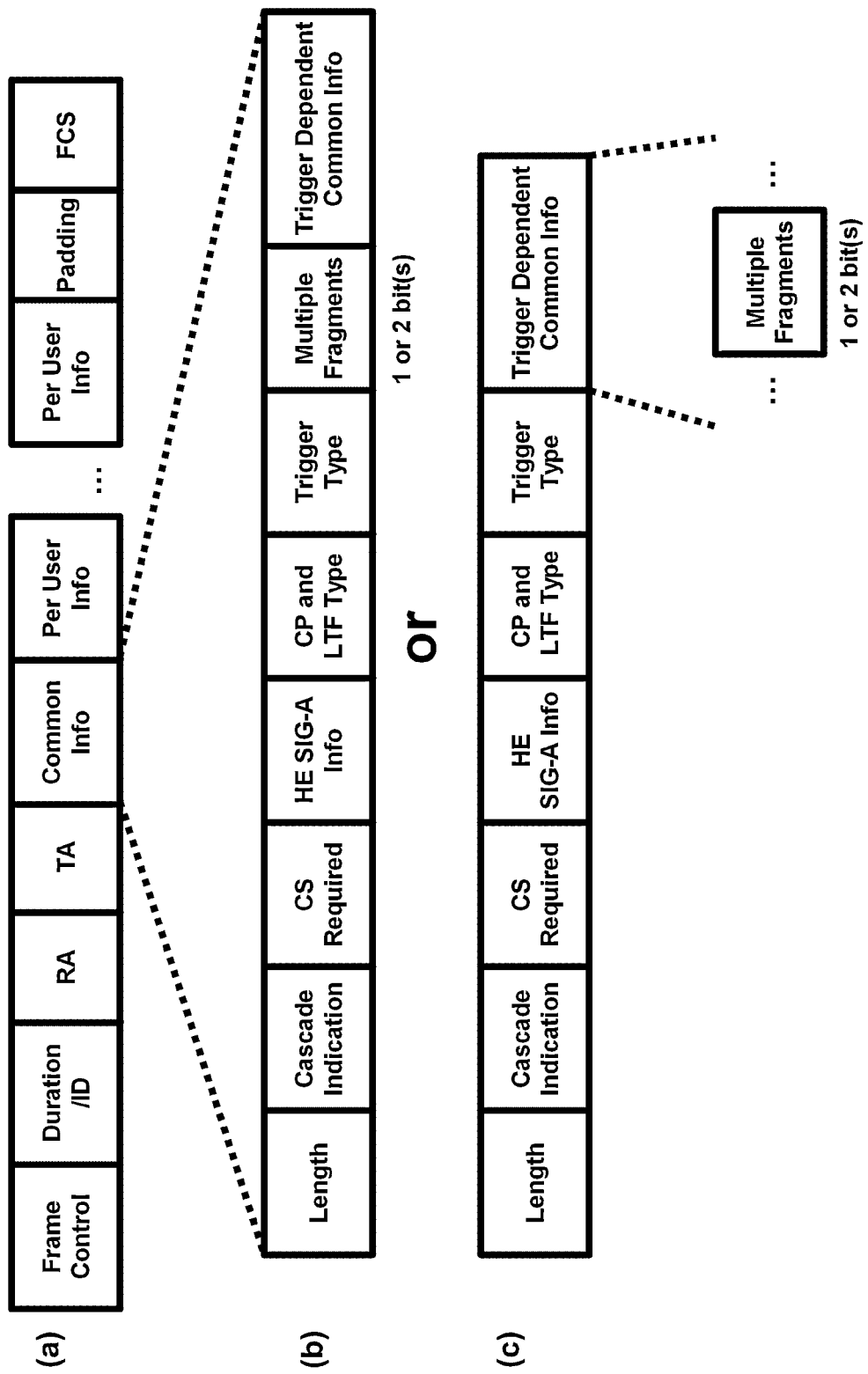
FIG. 11 shows the format of a trigger frame that signals information on a fragmentation level according to another embodiment of the present invention.

FIG. 11 shows the format of a trigger frame that signals information on a fragmentation level according to another embodiment of the present invention.

The wireless communication terminal may transmit information on the fragmentation level through the trigger frame. In this case, the trigger frame may trigger uplink multi-user (UL MU) transmission. Specifically, the information on the fragmentation level signaled through the trigger frame may indicate the level of fragmentation that the wireless communication terminal transmitting the trigger frame supports in receiving the data. In a specific embodiment, information on the fragmentation level signaled through the trigger frame may indicate the level of fragmentation that the wireless communication terminal transmitting the trigger frame supports when receiving data based on the trigger frame. A field indicating information on the fragmentation level may be referred to as a Multiple Fragments field. In a specific embodiment, the wireless communication terminal may insert a Multiple Fragments field into the Common Info field of the trigger frame. In this case, the format of the trigger frame may be the same as that in the embodiment of FIG. 11(a). For example, the wireless communication terminal may insert a Multiple Fragments field into the Trigger Dependent Common Info field of the trigger frame, as in the embodiment of FIG. 11(c). In another specific embodiment, the wireless communication terminal may insert a Multiple Fragments field in addition to the Trigger Dependent Common Info field in the Common Info field, as in the embodiment of FIG. 11(b).

As in the above-describe embodiments, the Multiple Fragmentation field may be a one-bit field indicating whether the fragmentation level is a level lower than level 2 or a level higher than level 2. In another specific embodiment, the Multiple Fragmentation field may be a 2-bit field indicating which level the fragmentation level is from level 0 to level 3.

Since the Common Info field of the trigger frame is commonly applied to wireless communication terminals receiving the trigger frame, the wireless communication terminal signals information on the same fragmentation level to all of the plurality of wireless communication terminals receiving the trigger frame. It may be inefficient to apply the same fragmentation level because the processing capability may differ between wireless communication terminals. Accordingly, there is a need for a method through which a wireless communication terminal may individually signal information on a level of fragmentation to each of a plurality of wireless communication terminals. This will be described with reference to FIG. 12.

Figure 12:
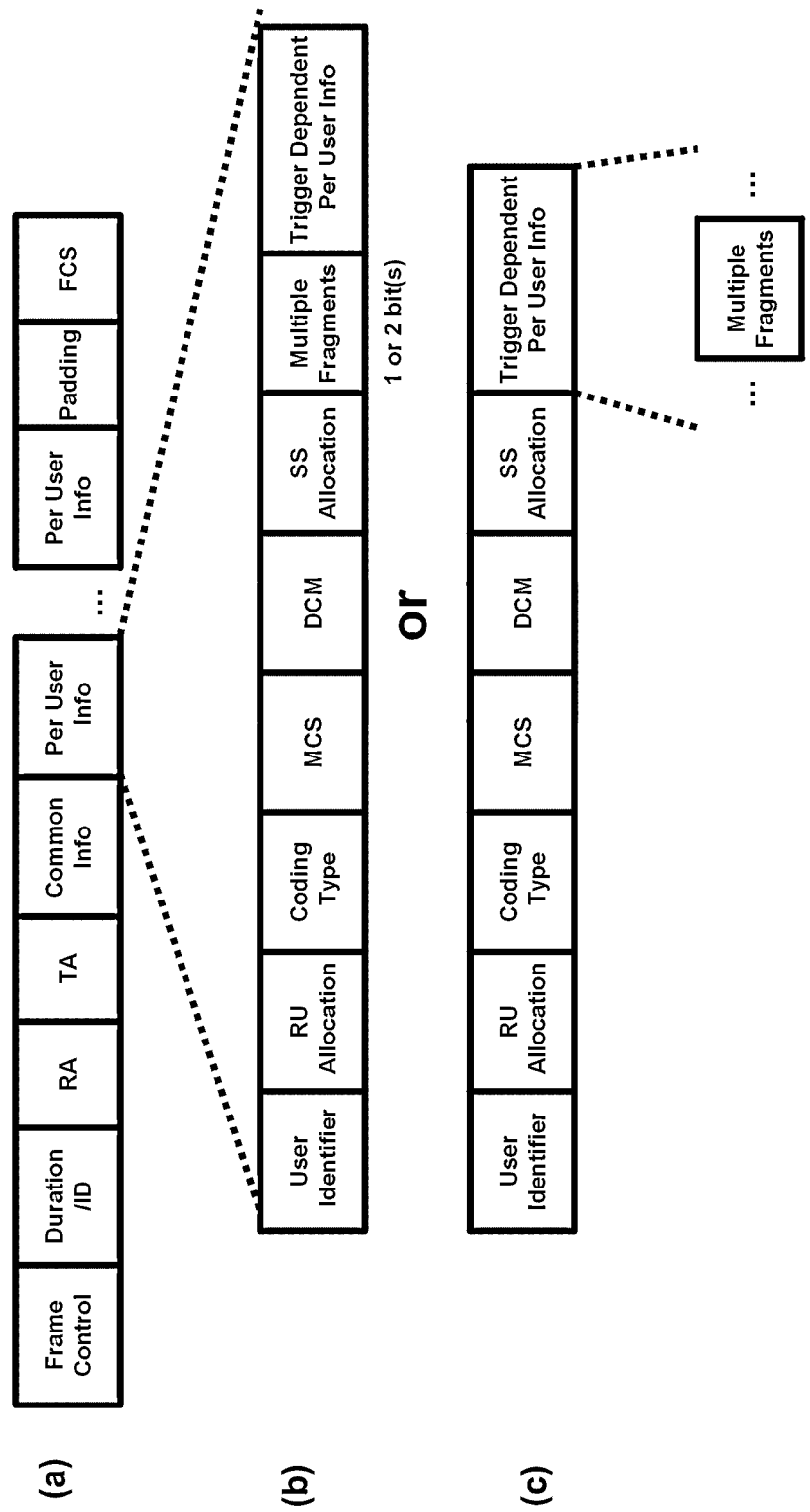
FIG. 12 shows the format of a trigger frame that signals information on a fragmentation level according to another embodiment of the present invention.

FIG. 12 shows the format of a trigger frame that signals information on a fragmentation level according to another embodiment of the present invention.

The wireless communication terminal may signal information on the fragmentation level applied to the wireless communication terminal corresponding to the Per User Info field through the Per User Info field of the trigger frame. In this case, the format of the information on the fragmentation level may be the same as that in the embodiment described with reference to FIG. 11. The format of the information on the fragmentation level may be the same as that in the embodiment described with reference to FIG. 11. Specifically, the information on the fragmentation level may be information on the fragmentation level limit to be used for data transmission based on the trigger frame. A field indicating information on the fragmentation level may be referred to as a Multiple Fragments field. A field indicating information on the fragmentation level may be referred to as a Multiple Fragments field.

The format of the trigger frame may be the same as that in the embodiment of FIG. 12(a). Specifically, the wireless communication terminal may insert a Multiple Fragments field into the Trigger Dependent Per User Info field as in the embodiment of FIG. 12(c). In another specific embodiment, the wireless communication terminal may insert a Multiple Fragments field in a Per User Info field other than the Trigger Dependent Per User Info field as in the embodiment of FIG. 12(b). The format of the specific Multiple Fragments field may be as described in the embodiment of FIG. 11.

If the originator allows a relatively high fragmentation level, the originator may generate fragments of various lengths and then selectively transmit the fragments according to the length of the A-MPDU. In this case, a wireless communication terminal having a relatively low processing capability may also rapidly transmit A-MPDUs of various lengths. For this, the recipient may allow the originator to have a relatively high fragmentation level, considering the processing capabilities of the originator. For this operation, the originator needs a way to signal the recipient's processing capability of the originator. This will be described with reference to FIG. 13.

Figure 13:
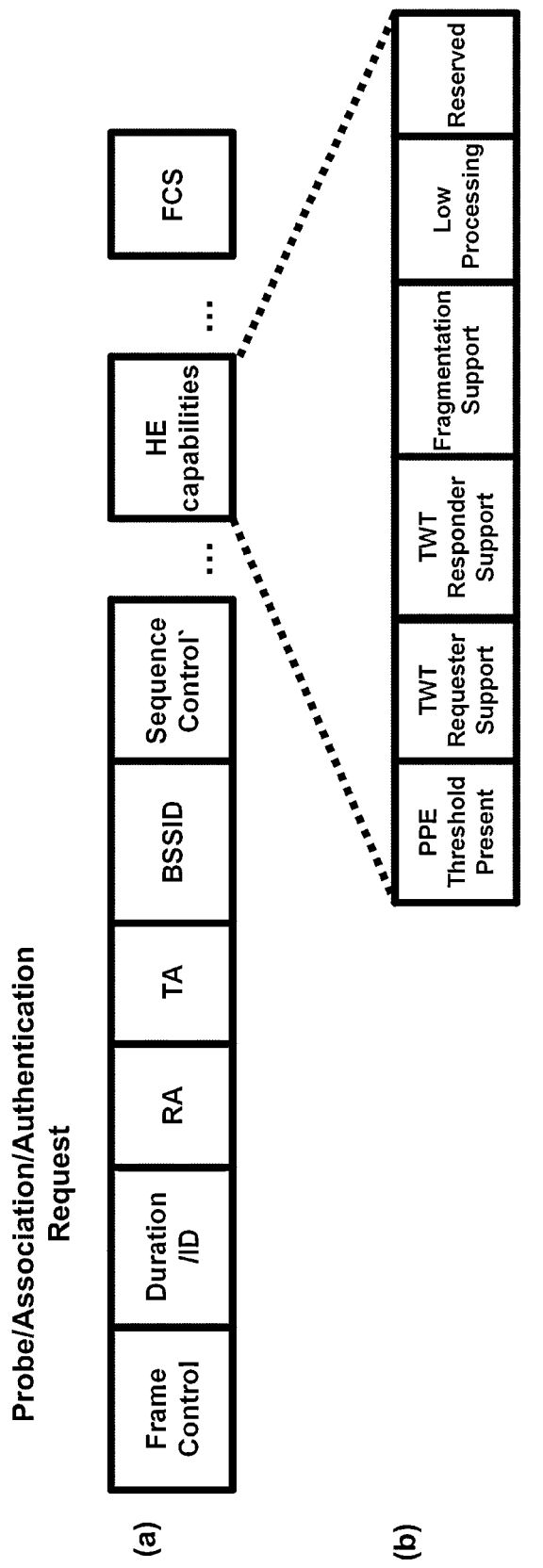
FIG. 13 shows a format of a Capabilities element for signaling information indicating the processing capability of a wireless communication terminal according to an embodiment of the present invention.

FIG. 13 shows a format of a Capabilities element for signaling information indicating the processing capability of a wireless communication terminal according to an embodiment of the present invention.

The wireless communication terminal may signal information indicating a request for permitting transmission of multiple fragments in the link setup process. In this case, the wireless communication terminal having received the information indicating the request for permitting the transmission of the multiple fragments may determine the fragmentation level allowed for the wireless communication terminal that transmitted the information indicating the request for permitting the transmission of the multiple fragments, based on the information indicating the request to permit transmission of multiple fragments. Specifically, the wireless communication terminal that has received the information indicating the request for permitting the transmission of the multiple fragments may determine the fragmentation level that is allowed for the wireless communication terminal that has transmitted the information indicating the request for permitting the transmission of the multiple fragments, as level 2.

Specifically, the wireless communication terminal may signal information indicating the processing capability of the wireless communication terminal as information indicating a request for permitting transmission of multiple fragments through any one of the authentication request frame, the association request frame, and the probe request frame. In a specific embodiment, the wireless communication terminal may signal information indicating the request for permitting the transmission the multiple fragments through a Capabilities element. In a specific embodiment, the wireless communication terminal may insert a Low Processing field indicating the request for permitting the transmission of the multiple fragments to be transmitted to the Capabilities element. For example, when the value of the Low Processing field is 1, the Low Processing field may indicate that multiple fragment transfer permission is requested.

It may be prioritized whether the wireless communication terminal that has received the information indicating the request for permitting the transmission of the multiple fragments is capable of receiving a plurality of fragments than whether the permitting of transmission of the multiple fragments is requested in the fragmentation level determination. That is because transmission of the fragment may be not allowed when the recipient is not capable of receiving the fragment. Therefore, the wireless communication terminal having received the information indicating the request for transmitting the multiple fragments may not permit the transmission of the multiple fragments even when the permission of the transmission of the multiple fragments is requested. Specifically, the wireless communication terminal having received the information indicating the request for transmitting the plurality of fragments may set the fragmentation level to level 0 or level 1 even when permission of the transmission of the multiple fragments is requested.

Figure 14:
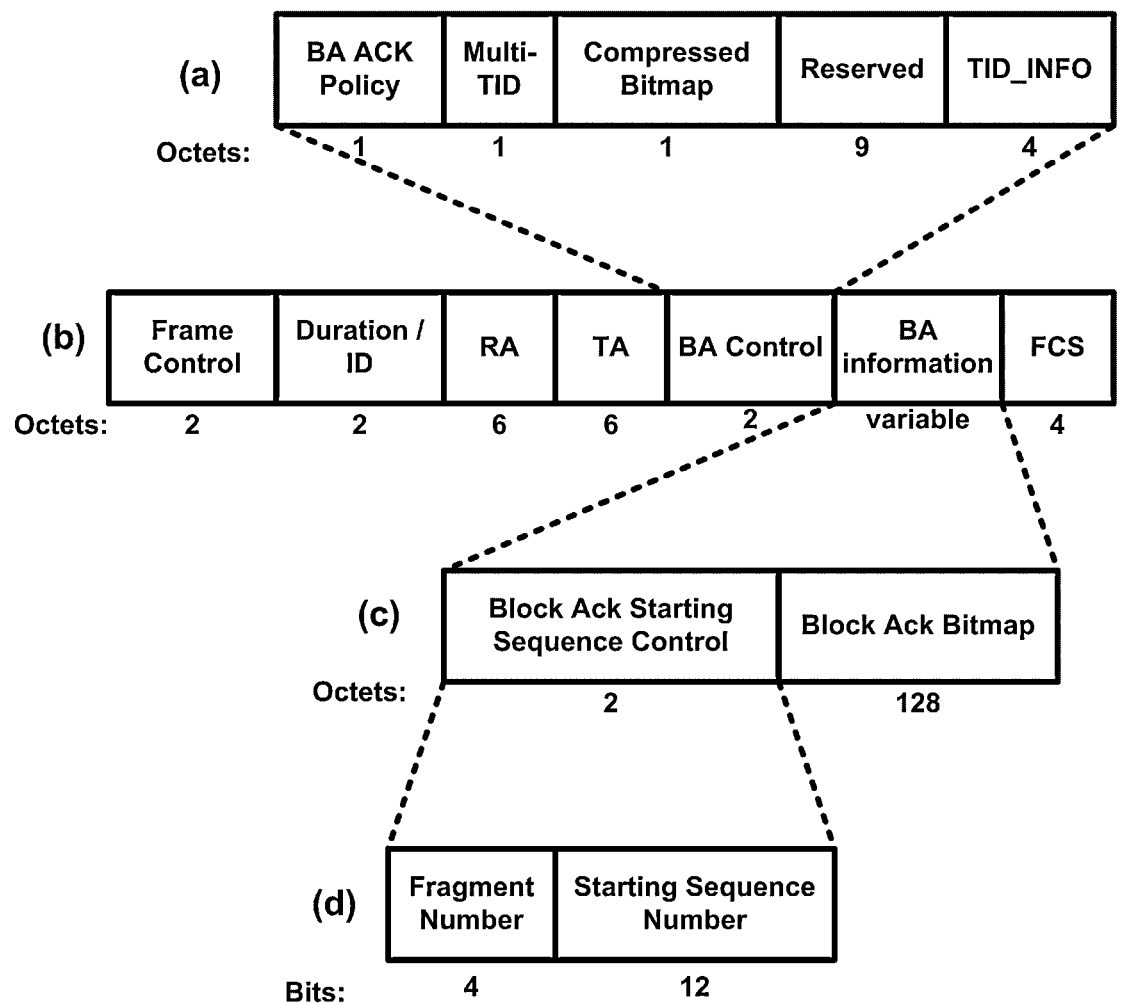
FIG. 14 shows a Block ACK frame format according to an embodiment of the present invention.

FIG. 14 shows a Block ACK frame format according to an embodiment of the present invention.

The recipient may transmit the receipt of multiple MPDUs transmitted by the originator in one Block ACK frame. The recipient may increase the transmission efficiency by transmitting the Block ACK frame and transmitting the ACK for each MPDU. The Block ACK frame includes a BA Information field including information on whether or not the MPDU is received. The format of the concrete Block ACK frame may be the same as that in the embodiment of FIG. 14(b). In this case, the BA Information field may include a Block ACK Bitmap field. The format of the specific BA Information field may be the same as that in the embodiment of FIG. 14(c). In addition, the format of the BA Control field may be the same as that in the embodiment of FIG. 14(a).

The Block ACK Bitmap field is a bitmap indicating whether or not the data is received described above. A legacy wireless communication terminal may transmit one MSDU in up to 16 fragments. Therefore, the legacy wireless communication terminal may indicate whether or not the fragments included in each of 64 MSDUs are received by using the Block ACK Bitmap field having a length of 128 bytes.

Specifically, the legacy wireless communication terminal allocates 1024 bits of the Block ACK Bitmap field to each fragment included in the MSDU, and sets a bit corresponding to the received fragment to 1. The legacy wireless communication terminal may indicate whether or not all fragments are received through the block ACK Bitmap field. Therefore, the legacy wireless communication terminal sets the Fragment Number field of the Block ACK Starting Sequence Control field to the reserved field and may use only the Sequence Number field. The concrete format of the Block ACK Starting Sequence Control field may be the same as that in the embodiment of FIG. 14(d).

The wireless communication terminal according to the embodiment of the present invention may fragment one MSDU into up to four fragments as described above. In addition, the number of fragments that the wireless communication terminal may generate by fragmenting the MSDU varies depending on the fragmentation level. Therefore, the wireless communication terminal may change the display method of the Block ACK Bitmap field according to the fragmentation level. Specifically, when the level of fragmentation applied to the data received by the wireless communication terminal is lower than level 3, the wireless communication terminal may set each bit of the Block ACK Bitmap field to indicate whether the MSDU is received or not. In addition, when the fragmentation level applied to the data received by the wireless communication terminal is level 3, the wireless communication terminal may set each bit of the Block ACK Bitmap field to indicate whether or not each of the fragments is received. This will be described with reference to FIGS. 15 to 21.

Figure 15:
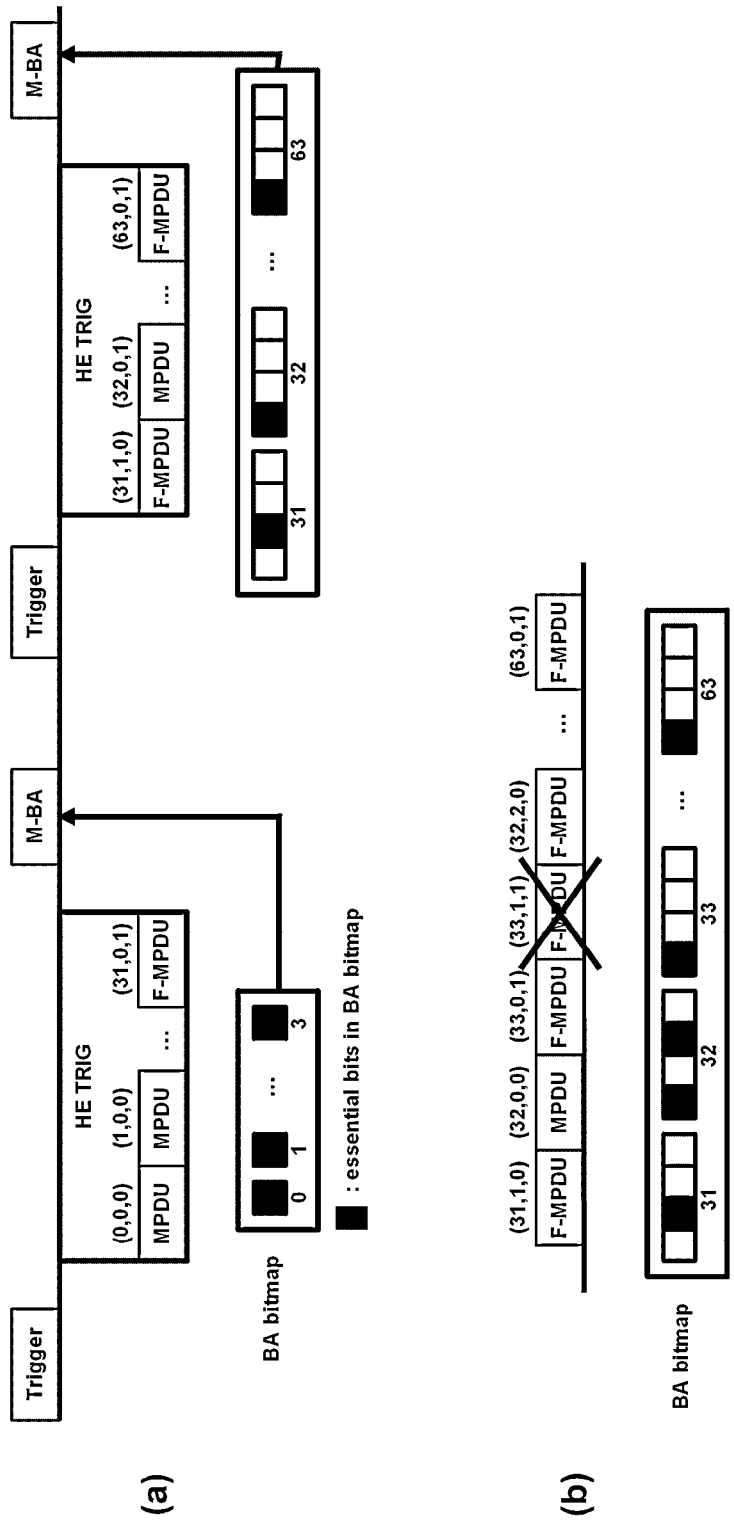
FIG. 15 shows a method of transmitting a Block ACK frame according to an embodiment of the present invention by a wireless communication terminal supporting fragmentation level: level 3.

FIG. 15 shows a method of transmitting a Block ACK frame according to an embodiment of the present invention by a wireless communication terminal supporting fragmentation level: level 3.

Even if the originator may use level 3 as the fragmentation level, the recipient may determine the format of the Block BA Bitmap field based on the fragment number of the received fragment. Specifically, when the fragment number of the fragment received by the recipient is all 0, the recipient may transmit a Block ACK frame including the Block ACK Bitmap field indicating whether each bit is received by the recipient to the originator. In this embodiment, even if the originator transmits an A-MPDU including the fragment, when a Block ACK frame including a Block ACK Bitmap field indicating whether each bit is received by a sequence is received, the originator may determine the received Block ACK frame as a Block ACK frame indicating whether the fragment number of the received fragment is 0 or not. When the fragment number of any of the multiple fragments received by the recipient is not 0, the recipient may transmit a Block ACK frame including a Block ACK Bitmap field indicating whether each bit is received by a fragment.

In the embodiment of FIG. 15(a), the recipient receives an MPDU including a fragment with a fragment number of 0 and an unformatted MSDU. Specifically, the recipient receives a fragment whose sequence number is 31 and whose fragment number is 0. Since the fragment number of the fragment received by the recipient is all 0, the recipient transmits a Block ACK frame of which each bit of the Block ACK Bitmap field indicates whether or not the MSDU is received. Then, the recipient receives the MPDU including the multiple fragments and the non-fragmented MSDUs. In this case, among the fragments received by the recipient, a fragment whose number is 1 not 0 is included. Therefore, the recipient transmits a Block ACK frame of which each bit of the Block ACK Bitmap field indicates whether or not the fragment is received.

In addition, in the embodiment of FIG. 15(b), the recipient receives an MPDU including multiple fragments and non-fragmented MSDUs. In this case, among the fragments received by the recipient, a fragment whose number is 1 not 0 is included. Therefore, the recipient transmits a Block ACK frame of which each bit of the Block ACK Bitmap field indicates whether or not the fragment is received.

Figure 16:
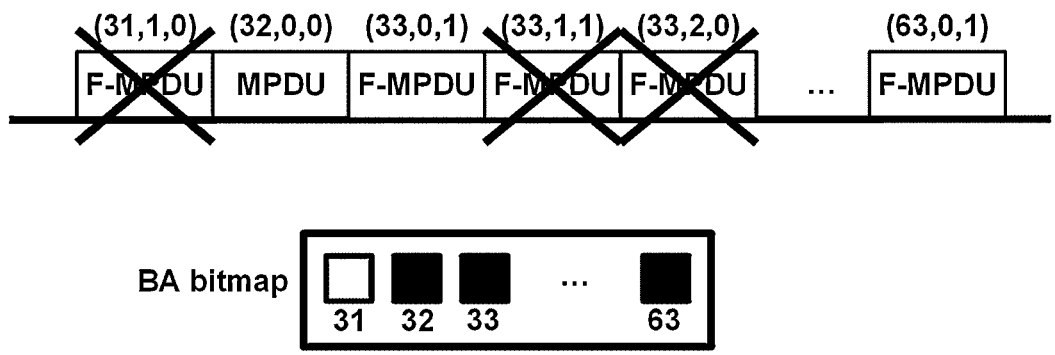
FIG. 16 shows a method of transmitting a Block ACK frame according to another embodiment of the present invention by a wireless communication terminal supporting fragmentation level: level 3.

FIG. 16 shows a method of transmitting a Block ACK frame according to another embodiment of the present invention by a wireless communication terminal supporting fragmentation level: level 3.

When the fragment number of the received fragment is all 0, regardless of the intended fragmentation level of the originator, the recipient may transmit a Block ACK frame including a Block ACK Bitmap field of which each bit indicates whether a sequence is received. In addition, the recipient may determine the fragmentation level intended by the originator through the embodiments described with reference to FIGS. 7 to 14. Further, another operation of the recipient may follow the embodiment described with reference to FIG. 15.

In the embodiment of FIG. 16, the recipient only receives MPDUs that include fragments with a fragment number of 0 and non-fragmented MSDUs. The originator transmits one frame with a sequence number of 31, one with a fragment number of 1, two frames with a sequence number of 33 and a fragment number of 1 and 2, respectively, but the recipient does not receive three fragments. Therefore, the recipient only receives fragments whose fragment number is 0. Accordingly, the recipient transmits a Block ACK frame including a Block ACK Bitmap field of which each bit indicates whether a sequence is received.

Figure 17:
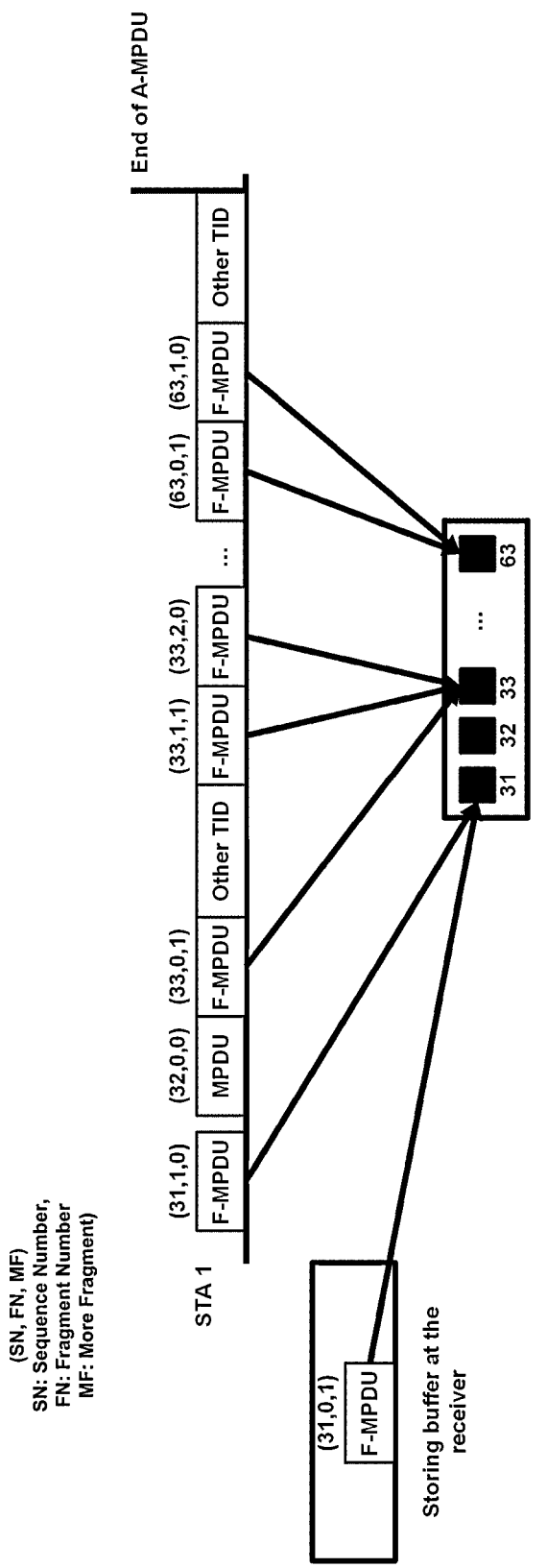
FIG. 17 shows a method of transmitting a Block ACK frame according to another embodiment of the present invention by a wireless communication terminal supporting fragmentation level: level 3.

FIG. 17 shows a method of transmitting a Block ACK frame according to another embodiment of the present invention by a wireless communication terminal supporting fragmentation level: level 3.

When the recipient receives all MSDUs corresponding to a specific TID, even if one MSDU corresponding to the corresponding TID is fragmented, the recipient may transmit a Block ACK frame including the Block ACK Bitmap field of which each bit indicates whether a sequence corresponding to the corresponding TID is received. In this case, the recipient may determine whether all MSDUs corresponding to the specific TID have been received based on the sequence number, the fragment number, and the More Fragment field. Also, when the recipient does not receive any fragment, the recipient may transmit a Block ACK frame indicating whether each bit of the Block ACK Bitmap field indicates receipt of the fragment. However, when the recipient does not receive all MSDUs corresponding to a specific sequence number, the recipient may transmit a Block ACK frame including a Block ACK Bitmap field indicating whether each bit is received by a sequence. In this embodiment, the originator may easily determine whether the originator fragments and transmits the data to the recipient. Therefore, even when the recipient transmits a Block ACK frame including a Block ACK Bitmap field of each bit indicates whether a sequence is received, the originator may clearly determine whether the recipient has received the fragment transmitted by the originator.

In the embodiment of FIG. 17, the originator fragments some of the MSDUs corresponding to the TID value of 1 and transmits the fragments to the recipient. The recipient receives all of the MSDUs for TID value 1 (sequence numbers 31 to 63). Specifically, the recipient receives the MSDU corresponding to the sequence number 31, 33, 63, etc. as a fragment. The recipient transmits a Block ACK frame for TID value 1. In this case, since the recipient has received all the MSDUs for the TID value 1, the recipient sets each bit of the Block ACK Bitmap field of the Block ACK frame for the TID value 1 to indicate whether the MSDU is received or not.

Figure 18:
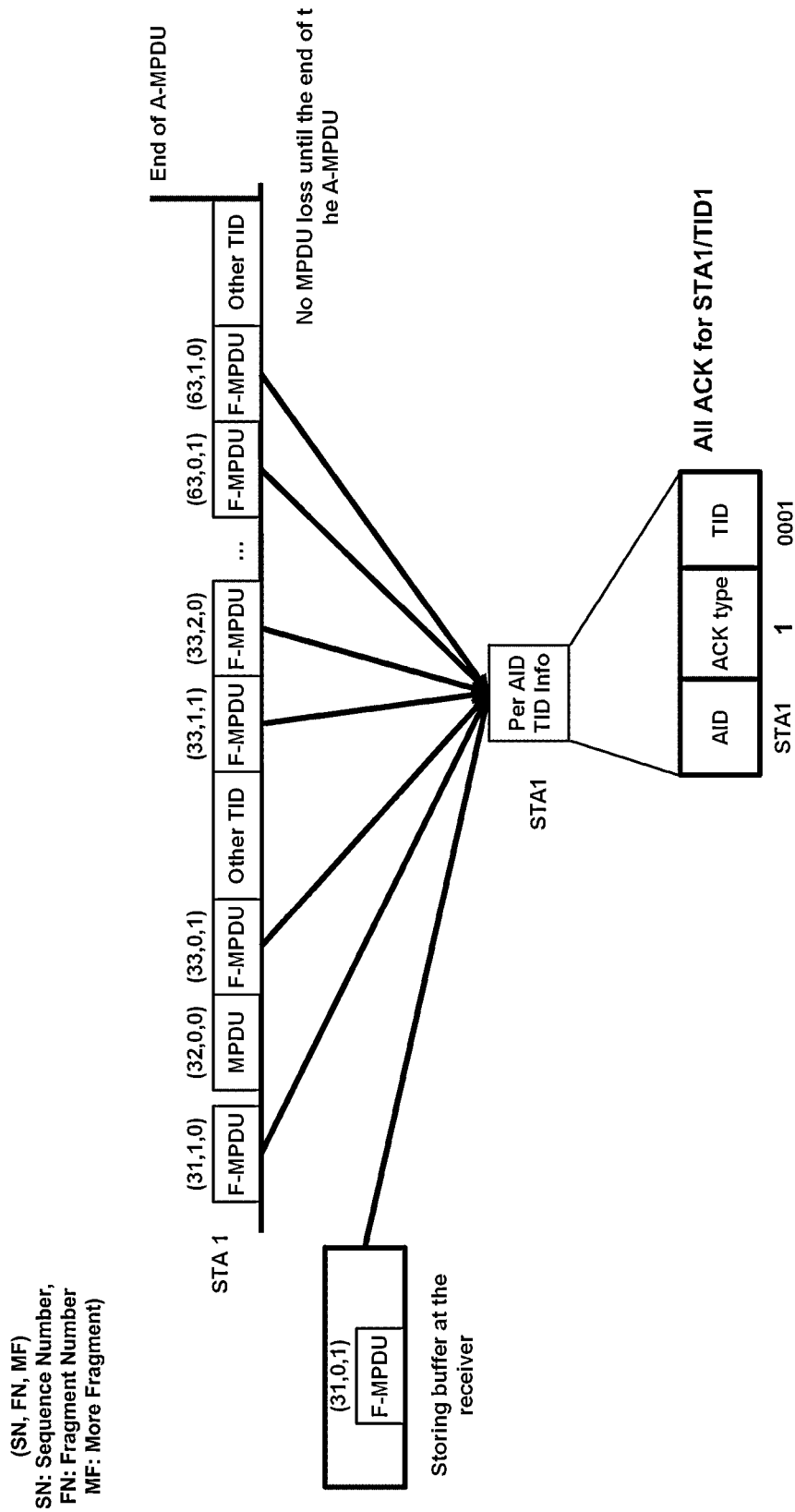
FIGS. 18 to 20 show a method of transmitting a Block ACK frame indicating All ACK according to another embodiment of the present invention by a wireless communication terminal supporting a fragmentation level: level 3.
Figure 19:
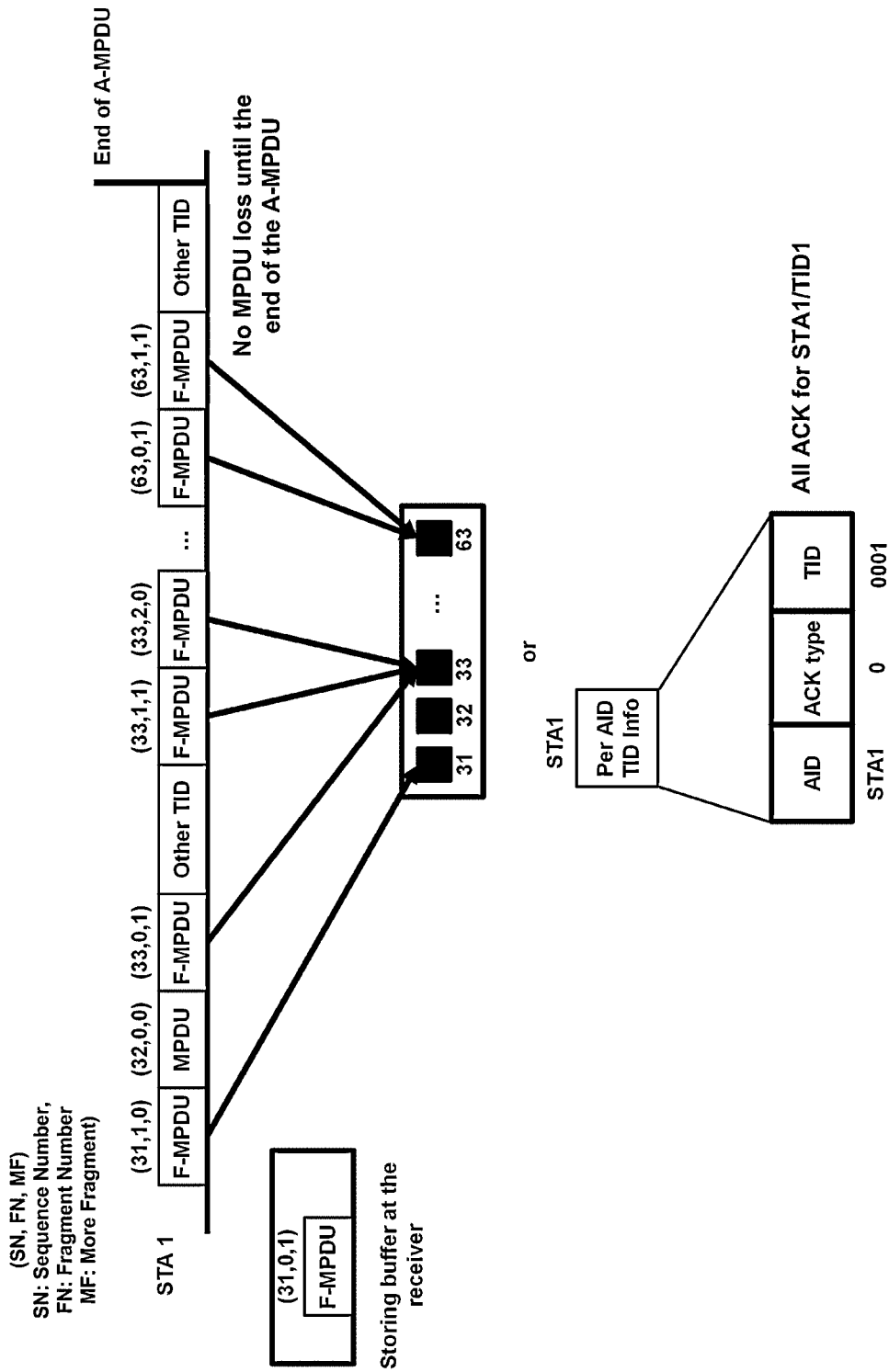
Figure 20:
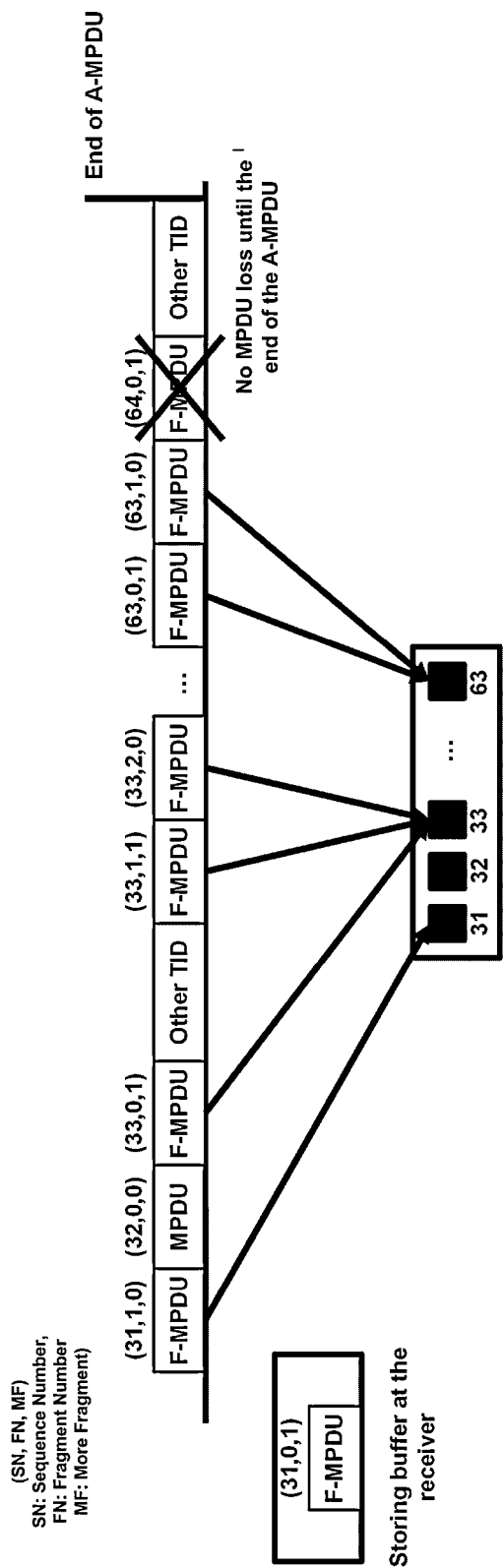

FIGS. 18 to 20 show a method of transmitting a Block ACK frame indicating All ACK according to another embodiment of the present invention by a wireless communication terminal supporting a fragmentation level: level 3.

Even if at least one MSDU corresponding to a specific TID is fragmented, in a case where the recipient receives all the MPDUs in the A-MPDU, the recipient may transmit a Block ACK frame indicating All ACK. All MPDUs in the A-MPDU may include not only a specific TID but also other TIDs. In this case, when the recipient receives all the MSDUs corresponding to the specific TID and receives all the MPDUs corresponding to the different TIDs in the corresponding A-MPDU, the recipient may determine that all the MPDUs in the A-MPDU have been received. In this case, even if the value of the More Fragment field of the fragment corresponding to the specific TID last received by the recipient is 1, in a case where the recipient receives all the other MPDUs transmitted following the last fragment, the recipient may determine that all of the MPDUs corresponding to the corresponding TID included in the corresponding A-MPDU have been received. In this case, the recipient may transmit a Block ACK frame including a Block ACK Bitmap field of which each bit indicates whether or not the MSDU is received. Also, when the recipient receives both the MPDU corresponding to the TID different from the specific TID as described above, the recipient may transmit a Block ACK frame indicating All ACK.

In addition, the Block ACK frame indicating the All ACK is a Block ACK frame indicating that the MPDU for all the TIDs indicated by the Block ACK frame is received without including the Block ACK Bitmap field. Specifically, the recipient may insert the originator's AID into the Per AID TID Info field, set the ACK type to a value indicating All ACK, and insert the corresponding TID.

In the embodiment of FIG. 18, the originator fragments some of the MSDUs corresponding to the TID value of 1 and transmits the fragments to the recipient as in the embodiment of FIG. 17. The recipient STA1 receives all of the MSDUs for TID value 1 (sequence numbers 31 to 63). In this case, the recipient STA1 receives all the MPDUs in the A-MPDU transmitting the MSDU for the TID value 1. Therefore, the recipient STA1 inserts the TID value 1 and the AID indicating the recipient STA1, sets the ACK type to All ACK, and transmits the Block ACK frame.

In the embodiment of FIG. 19, the recipient STA1 receives the MSDU corresponding to the TID value 1 (sequence numbers 31 to 63). In this case, the value of the More Fragment field of the last received fragment (sequence number 63, fragment number 1) of the fragment whose recipient STA1 corresponds to TID value 1 is 1. In this case, the recipient STA1 determines that all the fragments corresponding to TID 1 transmitted in the A-MPDU are received based on the reception of all the MPDUs transmitted after the corresponding fragment (sequence number 63, fragment number 1) in the A-MPDU. Therefore, the recipient STA1 inserts the TID value 1 and the AID indicating the recipient STA1, sets the ACK type to All ACK, and transmits the Block ACK frame.

In the embodiment of FIG. 20, the recipient STA1 receives the MSDU corresponding to the TID value 1 (sequence numbers 31 to 63). However, the recipient STA1 does not receive the fragment corresponding to the sequence number 64 and the fragment number 0. In this case, the recipient STA1 recognizes that the specific MPDU has not been received and may not determine which fragment is not received. Therefore, the recipient STA1 sets a Block ACK Bitmap field to indicate whether the MSDU is received or not, and transmits a Block ACK frame for the TID value 1.

Figure 21:
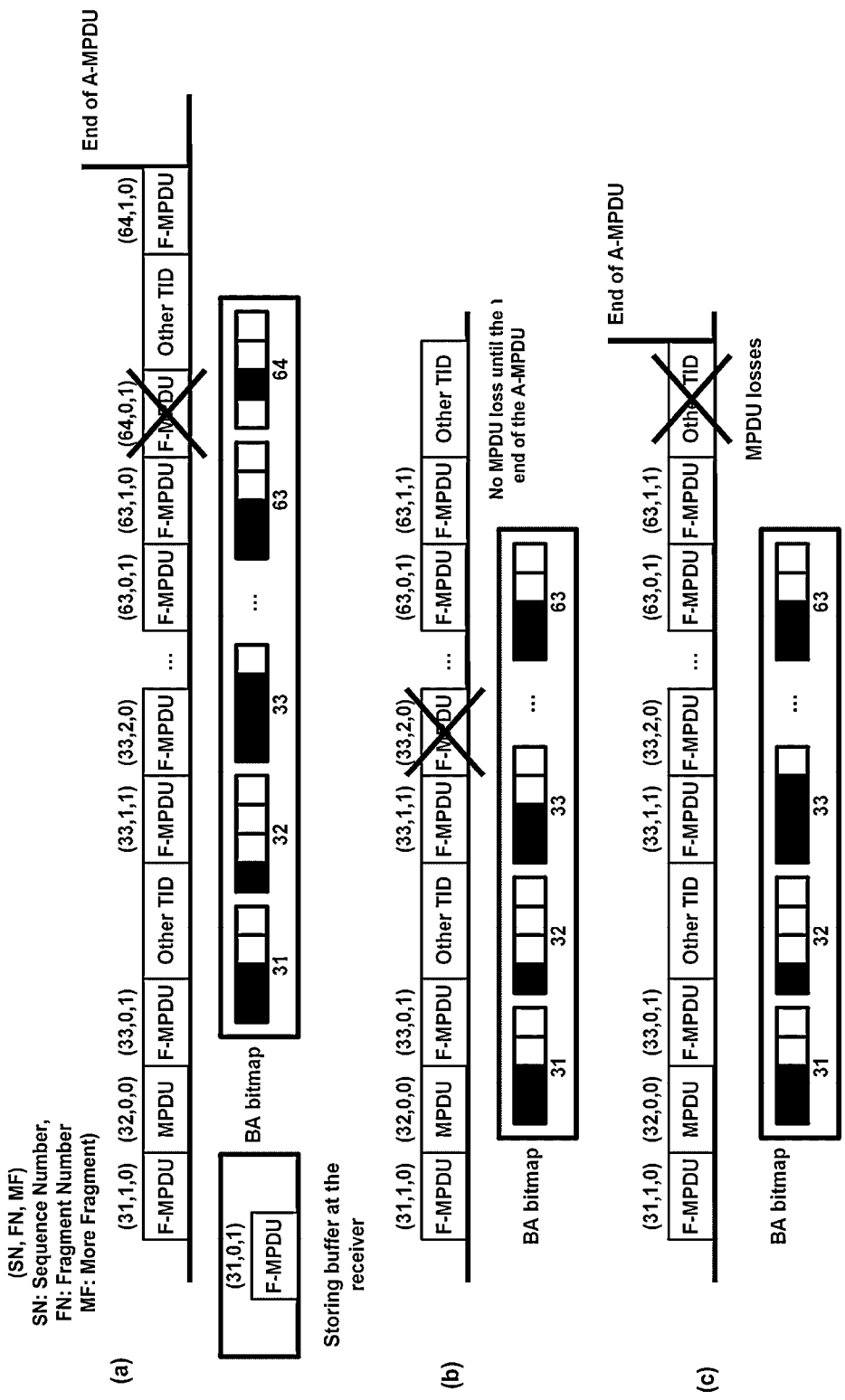
FIG. 21 shows an operation in which a wireless communication terminal supporting a fragmentation level: level 3 transmits a Block ACK frame including a Block ACK Bitmap field indicating whether a fragment is received according to another embodiment of the present invention.

FIG. 21 shows an operation in which a wireless communication terminal supporting a fragmentation level: level 3 transmits a Block ACK frame including a Block ACK Bitmap field indicating whether a fragment is received according to another embodiment of the present invention.

When the conditions of the embodiments described above through FIGS. 18 to 20 are not satisfied, the recipient may transmit a Block ACK frame including a Block ACK Bitmap field of which each bit indicates whether the fragment is received, for a specific TID.

In the embodiment of FIG. 21(a), the recipient does not receive a fragment corresponding to a specific TID, and having a sequence number of 64 and a fragment number of 0. The recipient receives a fragment corresponding to a specific TID, and having a sequence number of 64 and a fragment number of 1, and then the recipient recognizes that a fragment having a sequence number of 64 and a fragment number of 0 is not received. Therefore, the recipient transmits a Block ACK frame including a Block ACK Bitmap field of which each bit indicates whether or not a fragment to a specific TID is received, for a specific TID.

In the embodiment of FIG. 21(b), the recipient does not receive a fragment corresponding to a specific TID, and having a sequence number of 33 and a fragment number of 2. The recipient receives a fragment corresponding to the specific TID and having a sequence number of 33 or greater, and then the recipient may recognize that a fragment whose sequence number is 33 and whose fragment number 2 is not received. Therefore, the recipient transmits a Block ACK frame including a Block ACK Bitmap field of which each bit indicates whether or not a fragment is received, for a specific TID.

In the embodiment of FIG. 21(c), the recipient receives a fragment corresponding to a specific TID, and having a sequence number of 63 and a fragment number of 1 and dose not receive the MPDU transmitted later. In this case, since the value of the More Fragment field of the last transmitted fragment is 1, the recipient may not determine whether all fragments corresponding to a specific TID and transmitted in the A-MPDU are received. Therefore, the recipient transmits a Block ACK frame including a Block ACK Bitmap field of which each bit indicates whether or not a fragment received, for a specific TID.

Figure 22:
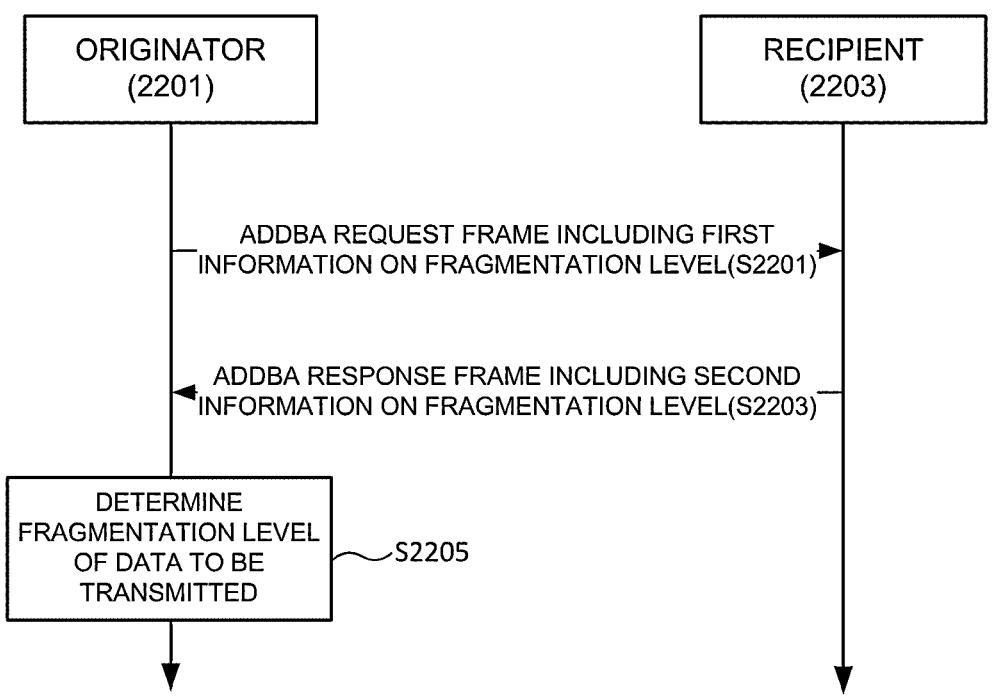
FIG. 22 shows the operation of a wireless communication terminal according to an embodiment of the present invention.

FIG. 22 shows the operation of a wireless communication terminal according to an embodiment of the present invention.

As described above, the originator 2201 may transmit the first information on the fragmentation level to the recipient 2203 in the ADDBA setup procedure. Specifically, the originator 2201 may transmit an ADDBA request frame including the first information on the fragmentation level to the recipient 2203 (S2201). Specifically, the originator 2201 may insert the first information on the fragmentation level to be used in transmission of the data to the recipient 2203 in the ADDBA request frame. The originator 2201 transmits the corresponding ADDBA request frame to the recipient 2203. The first information may be specified for each TID.

Specifically, the first information may relate to the fragmentation level that the originator 2201 intends to use when transmitting data corresponding to a specific TID to the recipient 2203. In a specific embodiment, the specific TID may be a TID specified in the Block ACK Parameter Set of the ADDBA request frame.

Also, the first information may indicate the maximum value of the fragmentation level that the originator 2201 will use when transmitting data to the recipient 2203. Specifically, the originator 2201 may set the fragmentation level which is signaled by the first information to level 0 to signal that the originator 2201 does not fragment data when transmitting the data for the corresponding TID. In addition, the originator 2201 may set the fragmentation level which is signaled by the first information to level 1 to signal that the originator intends to transmit the fragment corresponding to level 1 or lower when transmitting data for the corresponding TID. Specifically, the originator 2201 may set the fragmentation level which is signaled by the first information to level 1 to indicate that the originator 2201 will transmit one MPDU including one fragment when transmitting data for the corresponding TID. In this case, the MPDU may be a single MPDU that is not aggregated with another MPDU or an MPDU that is not an A-MPDU, as described above. In addition, the originator 2201 may set the fragmentation level which is signaled by the first information to level 2 to signal that the originator 2201 intends to transmit the fragment corresponding to level 2 or lower when transmitting data for the corresponding TID. Specifically, the originator 2201 may set the fragmentation level which is signaled by the first information to level 2 to signal that the originator 2201 intends to transmit one or fewer fragments for each MSDU when transmitting data for the corresponding TID through the A-MPDU. In addition, the originator 2201 may set the fragmentation level which is signaled by the first information to level 3 to signal that the originator intends to transmit the fragment corresponding to level 3 or lower when transmitting data for the corresponding TID. Specifically, the originator 2201 may set the fragmentation level which is signaled by the first information to level 3 to signal that the originator 2201 intends to transmit four or fewer fragments for each MSDU when transmitting data for the corresponding TID through the A-MPDU.

When the originator 2201 transmits an ADDBA request frame including the first information to the recipient 2203, the originator 2201 may insert the first information into the ADDBA Capabilities field included in the ADDBA request frame. Specifically, the ADDBA Capabilities field may include a Multiple Fragmentation field indicating the fragmentation level as in the embodiment described with reference to FIG. 7. The Multiple Fragmentation field may be a one-bit field indicating whether the fragmentation level is a level lower than level 2 or a level higher than level 2. In another specific embodiment, the Multiple Fragmentation field may be a 2-bit field indicating which level the fragmentation level is from level 0 to level 3.

The originator 2201 may insert the first information into the Buffer Size field, which is not the ADDBA Capabilities field of the ADDBA request frame, as in the embodiment described with reference to FIG. 9 to FIG. 10. Specifically, the originator 2201 may set some bits of the Buffer Size field of the ADDBA request frame to signal the first information. In a specific embodiment, the LSB 1 bit or the MSB 1 bit of the Buffer Size field of the ADDBA request frame may be set to signal the first information. In this case, the first information may indicate whether the fragmentation level is lower than level 2 or higher than level 2. In another specific embodiment, the originator 2201 may set the LSB 2 bits or the MSB 2 bits of the Buffer Size field of the ADDBA request frame to signal information on the fragmentation level. In this case, the information on the fragmentation level may indicate the level from the level 0 to the level 3 of the fragmentation level.

In another specific embodiment, the originator 2201 may implicitly signal information on the fragmentation level through the magnitude of the value represented by the Buffer Size field of the ADDBA request frame. For example, when the value of the Buffer Size field is 0, the Buffer Size field may indicate that the fragmentation level is level 0. Additionally, when the value of the Buffer Size field is 1, the Buffer Size field may indicate that the fragmentation level is level 1. Also, when the value of the Buffer Size field is greater than or equal to 2 and less than or equal to 63, the Buffer Size field may indicate that the fragmentation level is level 2. Also, when the value of the Buffer Size field is greater than or equal to 64 and less than or equal to 1023, the Buffer Size field may indicate that the fragmentation level is level 3.

The recipient 2203 receives the first information from the originator 2201 that is to transmit the data. More specifically, the recipient 2203 may receive an ADDBA request frame from the originator 2201 that is to transmit data. The recipient 2203 may obtain first information on the fragmentation level that the originator 2201 will use from the ADDBA request frame for the data to be transmitted to the recipient 2203.

The recipient 2203 may transmit the second information on the fragmentation level to the originator 2201. The second information may be specified for each TID. The second information may be information on the fragmentation level of the fragment that the recipient 2203 may receive when the recipient 2203 receives data corresponding to a specific TID. The specific TID may be a TID specified in the Block ACK Parameter Set of the ADDBA response frame. Specifically, the recipient 2203 may transmit an ADDBA response frame (S2203) including the second information on the fragmentation level to the originator 2201 (S2203). Specifically, the recipient 2203 may insert the second information into the ADDBA response frame. The recipient 2203 may transmit a corresponding ADDBA response frame to the originator 2201.

Further, the second information may indicate the maximum value of the level of the fragmentation that the recipient 2203 may receive. Specifically, the second information may indicate levels 0 to 3 as described above. In a specific embodiment, the recipient 2203 may set the fragmentation level which is signaled by the ADDBA response frame to level 0 to signal that the recipient 2203 may not receive the fragment when receiving data for the corresponding TID. In addition, the recipient 2203 may set the level of fragmentation signaled by the second information to level 1 to signal that the recipient 2203 is capable of receiving only fragments corresponding to level 1. Specifically, the recipient 2203 may set the level of fragmentation which is signaled by the second information to level 2 to indicate that the recipient 2203 will receive one MPDU including one fragment when receiving data for the corresponding TID. In addition, the recipient 2203 may set the level of fragmentation which is signaled by the second information to level 2 to signal that the recipient 2203 may only receive fragments corresponding to level 1 or level 2 when receiving data for a corresponding TID. Specifically, the recipient 2203 may set the level of fragmentation which is signaled by the second information to level 2 to signal that the recipient 2203 receives one MPDU including one fragment or an A-MPDU including one or fewer fragments per MSDU. In addition, the recipient 2203 may set the level of fragmentation signaled by the second information to level 3 to signal that the recipient 2203 is capable of receiving fragments corresponding to level 1, level 2, or level 3 when receiving data for a corresponding TID. Specifically, the recipient 2203 may set the level of fragmentation which is signaled by the second information to level 3 to signal that the recipient 2203 receives one MPDU including one fragment or an A-MPDU including four or fewer fragments per MSDU.

The recipient 2203 may insert the first information into the ADDBA Capabilities field that the ADDBA response frame includes. Specifically, the ADDBA Capabilities field may include a Multiple Fragmentation field indicating the fragmentation level as in the embodiment described with reference to FIG. 7. The Multiple Fragmentation field may be a one-bit field indicating whether the fragmentation level is a level lower than level 2 or a level higher than level 2. In another specific embodiment, the Multiple Fragmentation field may be a 2-bit field indicating which level the fragmentation level is from level 0 to level 3.

The recipient 2203 may insert the first information into the Buffer Size field, which is not the ADDBA Capabilities field of the ADDBA response frame, as in the embodiment described with reference to FIG. 9 to FIG. 10. Specifically, the recipient 2203 may set some bits of the Buffer Size field of the ADDBA response frame to signal the first information. In a specific embodiment, the LSB 1 bit or the MSB 1 bit of the Buffer Size field of the ADDBA response frame may be set to signal the first information. In this case, the first information may indicate whether the fragmentation level is lower than level 2 or higher than level 2. In another specific embodiment, the recipient 2203 may set the LSB 2 bits or the MSB 2 bits of the Buffer Size field of the ADDBA response frame to signal information on the fragmentation level. In this case, the information on the fragmentation level may indicate the level from the level 0 to the level 3 of the fragmentation level.

In another specific embodiment, the recipient 2203 may implicitly signal information on the fragmentation level through the size of the value represented by the Buffer Size field of the ADDBA response frame. For example, when the value of the Buffer Size field is 0, the Buffer Size field may indicate that the fragmentation level is level 0. Additionally, when the value of the Buffer Size field is 1, the Buffer Size field may indicate that the fragmentation level is level 1. Also, when the value of the Buffer Size field is greater than or equal to 2 and less than or equal to 63, the Buffer Size field may indicate that the fragmentation level is level 2. Also, when the value of the Buffer Size field is greater than or equal to 64 and less than or equal to 1023, the Buffer Size field may indicate that the fragmentation level is level 3.

The originator 2201 may obtain the second information from the recipient 2203. Specifically, the originator 2201 may receive the ADDBA response frame from the recipient 2203. The originator 2201 may obtain the second information from the ADDBA response frame. In this case, the originator 2201 may determine the fragmentation level of the data corresponding to the specific TID based on the second information. Specifically, the originator 2201 may determine a fragmentation level of data corresponding to a specific TID among data to be transmitted to the recipient 2203 based on the second information. Specifically, the originator 2201 may determine the fragmentation level of the data corresponding to a specific TID with a fragmentation level equal to or lower than the fragmentation level indicated by the second information.

The originator 2201 may generate a fragment by fragmenting the data corresponding to a specific TID at a determined fragmentation level and transmit the generated fragment to the recipient 2203. Specifically, the originator 2201 may generate fragments by fragmenting data corresponding to a specific TID at a fragmentation level equal to or lower than the fragmentation level indicated by the second information.

The recipient 2203 may receive data including the fragment from the originator 2201. The recipient 2203 may select the Block ACK frame format based on the ADDBA request frame received from the originator 2201. Specifically, the recipient 2203 may select the Block ACK frame format based on the second information. The recipient 2203 may select the format of the bitmap included in the Block ACK frame for each TID as in the embodiments described with reference to FIG. 14 to FIG. 21. When the data received by the recipient 2203 is transmitted through the A-MPDU, the A-MPDU includes at least one fragment, and the fragment number of the fragment is all 0, the recipient 2203 may transmit a Block ACK frame including a bitmap of which each bit indicates whether each MSDU is received. The specific operation of the recipient 2203 may be the same as the embodiments described with reference to FIG. 15 to FIG. 16.

When the data received by the recipient 2203 is transmitted through the A-MPDU and the recipient 2203 receives all the MPDUs included in the A-MPDU, the recipient 2203 may transmit a Block ACK frame including a bitmap of which each bit indicates whether or not each MAC Service Data Unit (MSDU) is received. The specific operation of the recipient 2203 may be the same as the embodiments described with reference to FIG. 17 to FIG. 21.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal that is an originator for transmitting data, the wireless communication terminal comprising:

a transceiver; and
a processor,
wherein the processor is configured to:
insert first information into 2 bits field of an add Block ACK (ADDBA) request frame and a value of a specific Traffic Identifier (TID) into a TID field of the ADDBA request frame, wherein the first information indicates a fragmentation level to be used when the wireless communication terminal transmits data corresponding to the specific TID to a recipient,
transmit the ADDBA request frame to the recipient by using the transceiver,
receive an ADDBA response frame from the recipient by using the transceiver,
obtain second information from 2 bits field of the ADDBA response frame and a value of a TID field of the ADDBA response frame, wherein the second information indicates a fragmentation level of a fragment that the recipient is capable of receiving when the recipient receives the data corresponding to a TID which corresponds to the value of the TID field of the ADDBA response frame, and
when the specific TID corresponds to the value of the TID field of the ADDBA response frame, fragment the data corresponding to the specific TID at a fragmentation level equal to or lower than the fragmentation level indicated by the second information,
wherein the fragmentation level indicates a degree of fragmentation and is divided into four levels, and one of the four levels is a level in which a fragmentation of the data is not allowed.

2. A method of operating a wireless communication terminal that is an originator for transmitting data, the method comprising:
inserting first information into 2 bits field of an add block ACK (ADDBA) request frame and a value of a specific Traffic Identifier (TID) into a TID field of the ADDBA request frame, wherein the first information indicates a fragmentation level to be used when the wireless communication terminal transmits data corresponding to the specific TID to a recipient; and
transmitting the ADDBA request frame to the recipient,
receiving an ADDBA response frame from the recipient,
obtaining second information from 2 bits field of the ADDBA response frame and a value of a TID field of the ADDBA response frame, wherein the second information indicates a fragmentation level of a fragment that the recipient is capable of receiving when the recipient receives the data corresponding to a TID which corresponds to the value of the TID field of the ADDBA response frame, and
when the specific TID corresponds to the value of the TID field of the ADDBA response frame, fragmenting the data corresponding to the specific TID at a fragmentation level equal to or lower than the fragmentation level indicated by the second information,
wherein the fragmentation level indicates a degree of fragmentation and is divided into four levels, and one of the four levels is a level in which a fragmentation of the data is not allowed.

* * * * *